(12) United States Patent
Zagars et al.

(10) Patent No.: US 11,652,203 B2
(45) Date of Patent: May 16, 2023

(54) CONTINUOUS AND SEMI-CONTINUOUS METHODS OF SEMI-SOLID ELECTRODE AND BATTERY MANUFACTURING

(71) Applicant: 24M Technologies, Inc., Cambridge, MA (US)

(72) Inventors: Raymond Zagars, Quincy, MA (US); Naoki Ota, Lexington, MA (US); Matthew R. Tyler, New York, NY (US); Richard K. Holman, Wellesley, MA (US); Ricardo Bazzarella, Woburn, MA (US); Mark Dudziak, Sharon, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 17/410,696

(22) Filed: Aug. 24, 2021

(65) Prior Publication Data
US 2022/0231274 A1    Jul. 21, 2022

Related U.S. Application Data

(63) Continuation of application No. 16/506,414, filed on Jul. 9, 2019, now Pat. No. 11,139,467.

(60) Provisional application No. 62/695,483, filed on Jul. 9, 2018.

(51) Int. Cl.
| | |
|---|---|
| *H01M 4/00* | (2006.01) |
| *H01M 4/139* | (2010.01) |
| *H01M 4/04* | (2006.01) |

(52) U.S. Cl.
CPC ......... *H01M 4/139* (2013.01); *H01M 4/0404* (2013.01); *H01M 4/0409* (2013.01)

(58) Field of Classification Search
None
See application file for complete search history.

(56) References Cited

U.S. PATENT DOCUMENTS

| | | | |
|---|---|---|---|
| 5,044,307 | A | 9/1991 | Takahashi et al. |
| 5,582,623 | A | 12/1996 | Chu |
| 6,379,403 | B1 | 4/2002 | Fukumura et al. |
| 6,423,446 | B1 | 7/2002 | Miyazaki et al. |
| 6,444,357 | B1 | 9/2002 | Kambe et al. |

(Continued)

FOREIGN PATENT DOCUMENTS

| | | |
|---|---|---|
| EP | 3168914 A1 | 5/2017 |
| JP | 2015-187943 A | 10/2015 |
| WO | WO-2020014268 A1 | 1/2020 |

OTHER PUBLICATIONS

First Examination Report for Indian Application No. 202117001891, dated Dec. 9, 2022, 6 pages.

(Continued)

*Primary Examiner* — David P Turocy
*Assistant Examiner* — Mohammad Mayy
(74) *Attorney, Agent, or Firm* — Cooley LLP

(57) ABSTRACT

Embodiments described herein relate generally to systems and methods for continuously and/or semi-continuously manufacturing semi-solid electrodes and batteries incorporating semi-solid electrodes. In some embodiments, the process of manufacturing a semi-solid electrode includes continuously dispensing a semi-solid electrode slurry onto a current collector, separating the semi-solid electrode slurry into discrete portions, and cutting the current collector to form a finished electrode.

24 Claims, 13 Drawing Sheets

(56) References Cited

U.S. PATENT DOCUMENTS

| | | | |
|---|---|---|---|
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,038,193 B1 | 7/2018 | Schroder et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,886,521 B2 | 1/2021 | Zagars et al. |
| 10,910,858 B2 | 2/2021 | Taylor et al. |
| 11,139,467 B2 | 10/2021 | Zagars et al. |
| 11,342,567 B2 | 5/2022 | Chiang et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 2008/0050653 A1 | 2/2008 | Berkowitz |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0099538 A1 | 4/2014 | Johnson |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0249258 A1 | 9/2015 | Wolf |
| 2015/0280267 A1 | 10/2015 | Chiang et al. |
| 2015/0295272 A1 | 10/2015 | Chiang et al. |
| 2015/0340702 A1 | 11/2015 | Sanada |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0211498 A1 | 7/2016 | Kim |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0104204 A1 | 4/2017 | Zhamu et al. |
| 2017/0149100 A1 | 5/2017 | Ishii |
| 2017/0162863 A1 | 6/2017 | Doherty et al. |
| 2017/0214034 A1 | 7/2017 | Ota et al. |
| 2017/0222254 A1 | 8/2017 | Sakamoto et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0019493 A1 | 1/2018 | Jakus et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0249678 A1 | 8/2021 | Chiang et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |

OTHER PUBLICATIONS

Office Action for U.S. Appl. No. 16/506,414, dated Dec. 7, 2020, 13 pages.

International Search Report and Written Opinion for International Application No. PCT/US2019/041061, dated Nov. 26, 2019, 13 pages.

CONTINUOUS AND SEMI-CONTINUOUS METHODS OF SEMI-SOLID ELECTRODE AND BATTERY MANUFACTURING

CROSS-REFERENCE TO RELATED APPLICATIONS

This application is a continuation of U.S. patent application Ser. No. 16/506,414 entitled "Continuous and Semi-Continuous Methods of Semi-Solid Electrode and Battery Manufacturing," filed Jul. 9, 2019, which claims priority to and the benefit of U.S. Provisional Patent Application No. 62/695,483 entitled "Continuous and Semi-Continuous Methods of Semi-Solid Electrode and Battery Manufacturing," filed Jul. 9, 2018, the disclosures of which is are hereby incorporated by reference in their entireties.

TECHNICAL FIELD

Embodiments described herein relate generally to systems and methods for continuously and/or semi-continuously manufacturing semi-solid electrodes and batteries incorporating semi-solid electrodes.

BACKGROUND

Battery manufacturing methods typically include coating a conductive substrate (i.e., a current collector) with a slurry that includes an active material, a conductive additive, and a binding agent dissolved or dispersed in a solvent. After the slurry is coated onto the metallic substrate, the slurry is dried (e.g., by evaporating the solvent) and calendered to a specified thickness. The manufacture of battery electrodes can also commonly include material mixing, casting, calendering, drying, slitting, and working (bending, rolling, etc.) according to the battery architecture being built. Because the electrode is manipulated during assembly, and to ensure conductive networks are in place, all components are compressed into a cohesive assembly, for example, by use of the binding agent. However, binding agents themselves occupy space, can add processing complexity, and can impede ionic and electronic conductivity. Thus, there is a need for improvements in electrochemical cells (e.g., batteries) and the manufacture of electrochemical cells, such as eliminating components of the electrochemical cell and/or providing reduced packaging for the electrochemical cell, while maintaining the same energy storage capabilities.

SUMMARY

Embodiments described herein relate generally to systems and methods for continuously and/or semi-continuously manufacturing semi-solid electrodes and batteries incorporating semi-solid electrodes. In some embodiments, the process of manufacturing a semi-solid electrode includes continuously dispensing a semi-solid electrode slurry onto a current collector, separating the semi-solid electrode slurry into discrete portions, and cutting the current collector to form a finished electrode.

DETAILED DESCRIPTION

Figure 1:
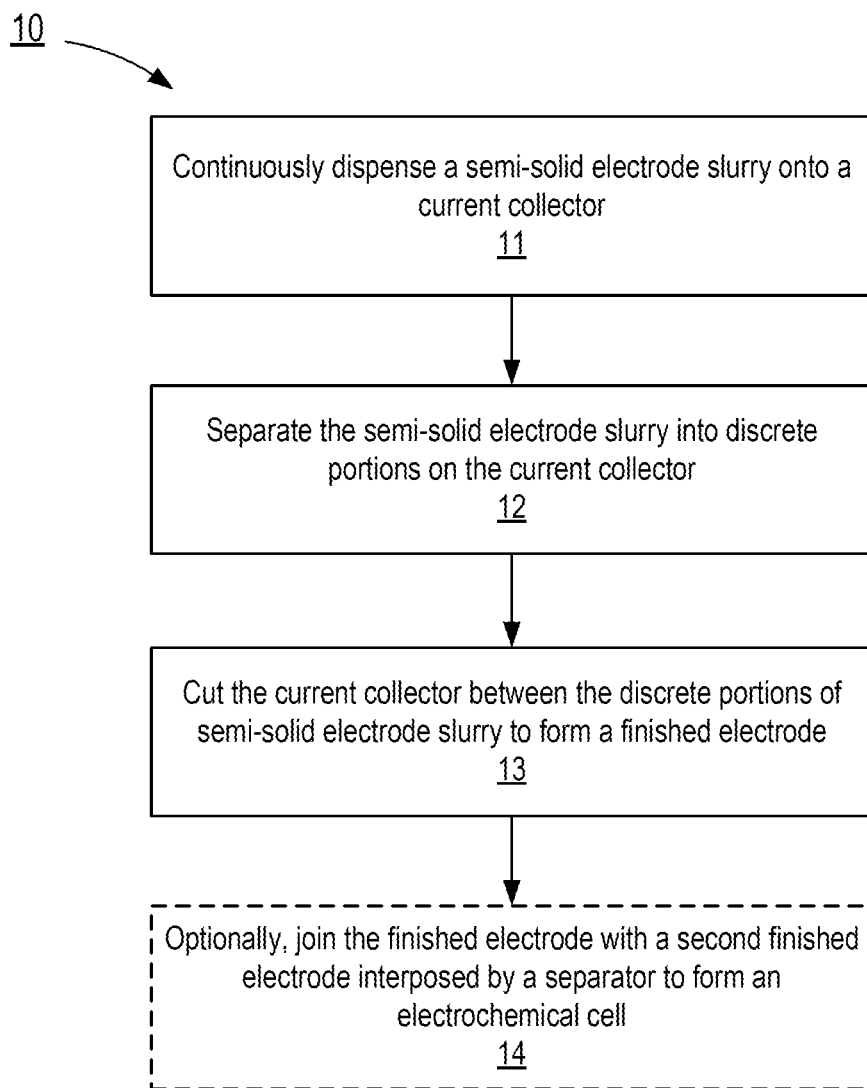
FIG. 1 illustrates steps of a process for manufacturing an electrode and, optionally, an electrochemical cell, according to an embodiment.

Embodiments described herein relate generally to systems and methods for continuously and/or semi-continuously manufacturing semi-solid electrodes and batteries incorporating semi-solid electrodes. Embodiments described herein relate generally to methods for manufacturing semi-solid electrodes include disposing a semi-solid electrode material onto a current collector. In some embodiments, the method can include continuously dispensing a semi-solid electrode slurry onto a current collector, separating the semi-solid electrode slurry into discrete portions, and cutting the current collector to form a finished electrode.

Conventional electrodes and conventional electrochemical cells are typically prepared by coating a discrete portion of metal foil substrate with a thin (e.g., about 10 μm to about 200 μm) wet slurry that is subsequently dried and calendered to a desired thickness. The slurry components in this method are typically active materials, conductive additives, a binding agent, and a solvent (e.g., commonly N-Methylpyrrolidone (NMP)). When the solvent is evaporated (in a drying oven covering the conveying line), the binder converts to a "glue" that holds all of the solid particles together in a matrix bound to the substrate. It is common for electrodes to be coated with the same materials on both sides of the substrate.

There are two common battery design approaches, (1) wound, and (2) stacked. In wound battery designs, electrode sheets can be cut to target dimensions, and then, with a separator placed in between, wound into a spiral or jelly-roll, then infiltrated with electrolyte and suitably packaged (typically in a cylindrical or rectangular metal can) to afford containment and electrical connections. In stacked battery designs, electrode sheets can also be cut to target dimension, but are then stacked on top of one another with separators placed in between. Thus, a stacked cell is composed of physically discrete electrode sheets rather than continuous electrodes (i.e., in anode/cathode pairs) in the case of wound cells. The stacked assembly can then be infiltrated with electrolyte and commonly packaged in either a pouch/bag, a plastic box, or a metal can, which can each also be referred to as a cell or battery casing as described herein.

In conventional pouch packaging, the pouch can perform several functions. One such function is to provide a hermetic isolation of battery materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the battery assembly.

Typical pouch materials can include laminates (e.g., multi-layer sheets), formed into, for example, two or three solid film-like layers and bound together by adhesive. The word "laminate" as used herein can also refer to layers of material that are not chemically adhered to one another. For example, the layers can be in areal contact with each other and coupled using other coupling methods, such as, for example, heat sealing. The inner layer can be, for example, a plastic layer, such as, for example, a cast polypropylene (CPP). The next or second layer can be a metal foil layer, such as, for example, aluminum or aluminum alloy. In some pouch configurations, there can be an additional layer(s). The additional layer can be, for example, a protective coating, formed with, for example, a plastic, such as nylon. The metal foil can provide the function of hermeticity, being much less permeable to certain compounds, especially water, than plastics. The inner plastic layer can be thermally bondable to itself, which is the convention regarding pouch closure and admission of electrical pass-throughs. In pouch closure, if the inner layers (e.g. CPP) of two pieces of pouch laminate are brought into physical contact, and heat is applied, the layers will melt and fuse, creating a robust seal if the processing conditions (e.g., power, temperature, duration) are chosen appropriately. For example, when the sealing is done in a closed loop, an interior volume can be formed that is isolated from the ambient or exterior environment.

Some known electrochemical cells (e.g., batteries) can include a variety of shapes and/or sizes, can be based on a wide variety of enabling materials and internal architectures, can be either passive or actively controlled, can be rechargeable or not, and/or can share certain common features that can allow them to convert chemical energy to electrical energy. Some known batteries can include a first electrode having a high electrochemical potential and a second electrode having a lower electrochemical potential relative to the first electrode. Each electrode can include an active material that participates in a chemical reaction and/or physicochemical transformation during discharge by virtue of a favored thermodynamic change of material states, which can result in the flow of electrical current when a switch is closed. In some cases, for charge transfer to occur, two distinct conductive networks can allow the anode and cathode to be electrically connected. A separator can be used to provide isolation of the anode and cathode such that only ions are able to pass through it, and to prevent short circuiting.

The manufacture of battery electrodes can be a complex and capital intensive process, and can commonly include material mixing, casting, calendering, drying, slitting, and working (bending, rolling, etc.) according to the battery architecture being built. Because the electrode is manipulated during assembly, and to ensure conductive networks are in place, all components are compressed into a cohesive assembly, for example, by use of a binding agent. However, binding agents themselves occupy space, can add processing complexity, and can impede ionic and electronic conductivity.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "z-direction" generally means the third direction where longitudinal and transverse are the first and second directions. In other words, the z-direction refers to the depth or thickness of a feature as opposed to length and width.

As used herein, the term "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 shows a schematic illustration of a method 10 of manufacturing a semi-solid electrode in a continuous or semi-continuous manner. In some embodiments, the method 10 includes continuously dispensing a semi-solid electrode slurry onto a current collector 11 as it passes through a conveyance system. In some embodiments, the conveyance system can be configured to continuously or semi-continuously transport the current collector past a fixed dispensing mechanism. In some embodiments, the dispensing mechanism can be adjustable and/or can move with respect to the current collector. In some embodiments, the fixed dispensing mechanism can be a nozzle configured to dispense the semi-solid electrode slurry at a predetermined and precise rate onto specific regions of the current collector as it is passes the fixed dispensing mechanism.

Dispensing the semi-solid slurry can generate a significant amount of force upon the conveyance system. The force generated by dispensing the semi-solid slurry is proportional to the loading of the semi-solid slurry (i.e., higher viscosity semi-solid slurry loading generates more force upon the conveyance system). In some embodiments, the force acting upon the conveyance system can be greater than 2,000 lbf, greater than 2,500 lbf, greater than 3,000 lbf, or greater than 3,500 lbf. This force can cause mechanical deflections in the conveyance system, regardless of how thoroughly the system is designed to limit deflections. These deflections can influence the casting gaps between the dispensing mechanism and the current collector, which impacts the thickness of the electrode. In some embodiments, the deflection can reach 100 μm over the course of only 10 mm of movement of the current collector through the conveyance system. In some embodiments, an adjustable dispensing mechanism can move in such a way to counteract these deflections. In other words, the adjustable dispensing mechanism can move up and down (i.e., along the z-axis) to compensate for the deflection caused by force of the dispensed slurry. In some embodiments, the dispensing mechanism can move up and down (i.e., in the z-direction) along the entire width of the electrode. In some embodiments, the dispensing mechanism can move up and down on the left side of the electrode in a tilted manner, such that the dispensing mechanism is lower on the left side of the electrode than on the right side of the electrode. In some embodiments, the dispensing mechanism can move up and down on the right side of the electrode in a tilted manner, such that the dispensing mechanism is lower on the right side of the electrode than on the left side of the electrode.

In some embodiments, the dispensing mechanism can move to control casting gaps between the dispensing mechanism and the current collector to a precision of less than 10 μm, less than 9 μm, less than 8 μm, less than 7 μm, less than 6 μm, less than 5 μm less than 4 μm, less than 3 μm, less than 2 μm, or less than 1 μm. In some embodiments, the dispensing mechanism can move along the z-axis a distance of greater than about 1 μm, greater than about 5 μm, greater than about 10 μm, greater than about 20 μm, greater than about 30 μm, greater than about 40 μm, greater than about 50 μm, greater than about 60 μm, greater than about 70 μm, greater than about 80 μm, greater than about 90 μm, or greater than about 100 μm in order ensure the precision of the electrode thickness. The dispensing mechanism can be adjusted very rapidly in order to match the timing of the movement of the conveyance system. In some embodiments, the counteracting motion of the dispensing mechanism can occur in less than 0.5 seconds, less than 0.4 seconds, less than 0.3 seconds, less than 0.2 seconds, less than 0.1 seconds, less than 0.09 seconds, less than 0.08 seconds, less than 0.07 seconds, less than 0.06 seconds, less than 0.05 seconds, less than 0.04 seconds, less than 0.03 seconds, less than 0.02 seconds, or less than 0.01 seconds. For example, the casting gap can be changed from 150 μm to 200 μm in 0.1 seconds, and the 200 μm gap can be achieved with 1 μm precision. The casting gap can then be subsequently changed from 200 μm to 175 μm in 0.1 seconds, and the 175 μm gap can be achieved with 1 μm precision. In some embodiments, servo-controlled motions can control the motions of the dispensing mechanism to control casting gaps to the desired level of precision. In some embodiments, beta gauge readings for the most recently produced electrodes can be used to determine the movement schedule for the dispensing mechanism. In some embodiments, the dispensing mechanism can control casting gaps between the dispensing mechanism and the current collector within the casting nozzle. In some embodiments, a blade within the casting nozzle can move up and down to control casting gaps between the dispensing mechanism and the current collector. In some embodiments, the semi-solid electrode slurry can be configured to remain in predetermined regions once dispensed onto the current collector.

In some embodiments, the electrodes including the semi-solid electrode slurry described herein can decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, can now be occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. Without wishing to be bound by any particular theory, the reduced tortuosity and a higher electronic conductivity of the semi-solid electrodes described herein, results in superior rate capability and charge capacity of electrochemical cells formed from the semi-solid electrodes.

In some embodiments, the current collector is a strip of conductive material that is not yet apportioned into discrete current collectors. The current collector has a length defining a longitudinal axis, and a width that is defined as a dimension perpendicular to the longitudinal axis. The current collector is configured to be transported though the conveyance system (i.e., the direction of travel) along its longitudinal axis. In some embodiments, the width of the current collector can be substantially similar to the desired width or height of the current collector to be used in the finished semi-solid electrode. In some embodiments, the width of the current collector can be greater than about 101%, 105%, 110%, 120%, 130%, 140%, 150%, 175%, 200%, 300%, 400%, or 500% of the desired width or height of the current collector to be used in the finished semi-solid electrode.

In some embodiments, the current collector has a thickness of between about 0.01 μm and about 100 μm, between about 100 nm and about 100 μm, between about 1 μm and about 95 µm, between about 1 µm and about 90 µm, between about 1 µm and about 85 µm, or between about 1 µm and about 80 µm, inclusive of all values and ranges therebetween. In some embodiments, the current collector has a thickness of less than about 500 µm, less than about 400 µm, less than about 300 µm, less than about 200 µm, less than about 100 µm, less than about 90 µm, less than about 80 µm, less than about 70 µm, less than about 60 µm, less than about 50 µm, less than about 45 µm, less than about 40 µm, less than about 35 µm, less than about 30 µm, less than about 25 µm, less than about 20 µm, less than about 19 µm, less than about 18 µm, less than about 17 µm, less than about 16 µm, less than about 15 µm, less than about 14 µm, less than about 13 µm, less than about 12 µm, less than about 11 µm, less than about 10 µm, less than about 9 µm, less than about 8 µm, less than about 7 µm, less than about 6 µm, less than about 5 µm, less than about 5 µm, less than about 4 µm, less than about 3 µm, less than about 2 µm, less than about 1 µm, less than about 900 nm, less than about 750 nm, less than about 500 nm, or less than about 100 nm, inclusive of all values and ranges therebetween.

The current collector is electronically conductive and can be electrochemically inactive under the operation conditions of the cell. In some embodiments, current collector materials can include copper, aluminum, and/or titanium for the negative current collector and aluminum for the positive current collector. In some embodiments, aluminum is used as the current collector for positive electrode. In some embodiments, copper is used as the current collector for negative electrode. In other embodiments, aluminum is used as the current collector for negative electrode.

The semi-solid electrode slurry can be electrochemically configured to be used in the anode and/or the cathode. The semi-solid electrode slurry can include an active material in a liquid electrolyte. In some embodiments, the active material, which may be organic or inorganic, can include but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Electrode formulations can include, for example, (1) active materials (i.e., the sources and sinks of ions and electrons), (2) carbon (or a mixture of carbons) or other material(s) having the primary, but not necessarily exclusive, function of electronic conduction, and (3) an electrolyte (e.g., a solvent or solvent mixture plus salt(s)) having the primary, but not necessarily exclusive function of ionic conduction. The electrode formulation may optionally include other additives having specific intended chemical, mechanical, electrical, and/or thermal functions. Electrode formulations can include, for example, the active materials, compositions, and/or semi-solid suspensions described in U.S. Pat. No. 8,993,159, entitled "Semi-Solid Electrodes Having High Rate Capability," and U.S. Pat. No. 9,437,864, entitled "Asymmetric Battery Having a Semi-Solid Cathode and High Energy Density Anode," the entire disclosures of which are hereby incorporated by reference, respectively.

In some embodiments, the semi-solid electrode slurry can include a conductive additive, a stabilizing additive, and/or a gelling agent. Examples of semi-solid electrode slurries can be found in U.S. Pat. Nos. 8,993,159, 9,178,200, 9,184,464, 9,203,092, and 9,484,569, the entire disclosures of which are hereby incorporated herein by reference.

In some embodiments, electrodes and electrochemical cells manufactured directly with a semi-solid electrode slurry avoid the use of conventional binding agents and the conventional electrode casting step altogether. Using a semi-solid electrode slurry can also eliminate the need for infusing the electrode material with the electrolyte since the semi-solid electrode slurry already includes the electrolyte. Some benefits of this approach include, for example: (i) a simplified manufacturing process with less equipment (i.e., less capital intensive), (ii) the ability to manufacture electrodes of different thicknesses and shapes (e.g., by changing an extrusion die slot dimension or other process conditions), (iii) processing of thicker (>100 µm) and higher areal charge capacity (mAh/cm2) electrodes, thereby decreasing the volume, mass, and cost contributions of inactive components with respect to active material, and (iv) the elimination of binding agents, thereby reducing tortuosity and increasing ionic conductivity of the electrode.

In some embodiments, the current collector can be moved past the dispensing mechanism at a rate of greater than about 1 meter per minute, greater than about 5 meters per minute, greater than about 10 meters per minute, greater than about 15 meters per minute, greater than about 20 meters per minute, greater than about 25 meters per minute, greater than about 30 meters per minute, greater than about 35 meters per minute, greater than about 40 meters per minute, greater than about 45 meters per minute, greater than about 50 meters per minute, greater than about 55 meters per minute, greater than about 60 meters per minute, greater than about 65 meters per minute, greater than about 70 meters per minute, greater than about 75 meters per minute, greater than about 80 meters per minute, greater than about 85 meters per minute, or greater than about 100 meters per minute, inclusive of all values and ranges therebetween. In some embodiments, the rate at which the current collector is moved past the fixed dispensing point can be between about 1 meter per minute and about 100 meters per minute, between about 5 meters per minute and about 80 meters per minute, between about 10 meters per minute and about 70 meters per minute, between about 20 meters per minute and about 60 meters per minute, and between about 30 meters per minute and about 50 meters per minute, inclusive of all values and ranges therebetween.

In some embodiments, the current collector can be transported past the dispensing mechanism using a transmission belt, a vacuum pallet, a vacuum conveyor, a belt conveyor, rollers, moving pan, a pneumatic conveyor, a hydraulic conveyor, a vibrating conveyor, a vertical conveyor, a spiral conveyor, by pulling or pushing the current collector across a surface having a low coefficient of friction, any other suitable equipment or approach, or combinations thereof. In some embodiments, the current collector can be thin and highly deformable, so care should be taken not to wrinkle, fold, tear, bend, dent, or otherwise mishandle the current collector during conveyance. In some embodiments, in order to help protect the current collector from such damage, the current collector can be disposed onto a pouch material before the semi-solid electrode slurry is disposed onto the current collector (e.g., step 11). In some embodiments, disposing the current collector onto a pouch material before the semi-solid electrode slurry is disposed onto the current collector may also help in transporting the current collector past the dispensing mechanism.

The method 10 further includes separating the semi-solid electrode slurry into discrete portions on the current collector 12. In some embodiments, the semi-solid electrode slurry can be separated into the discrete portions on the current collector 12 by removing a portion of the continuously deposited semi-solid electrode slurry. In some embodiments, the semi-solid electrode slurry can be separated into the discrete portions on the current collector 12 by making a portion of the current collector temporarily unavailable to receive the deposited semi-solid electrode slurry thereto. In some embodiments, the semi-solid electrode slurry can be separated into the discrete portions on the current collector 12 by changing the length of the current collector with regard to the length of continuously deposited semi-solid electrode slurry. In some embodiments, the semi-solid electrode slurry can be separated into the discrete portions on the current collector 12 by removing a previously disposed obstructive material from the current collector once the semi-solid electrode slurry has been deposited. In some embodiments, the discrete portions can be discrete electrodes created by first disposing a mask material to at least a portion of the current collector, disposing the semi-solid electrode slurry onto the masked current collector, and the mask material can then be removed to define the finished electrode or electrodes.

In some embodiments, the semi-solid electrode slurry can be separated into discrete portions on the current collector 12 by any of ultrasonication, laser ablation, doctor blade, irradiation, high-precision cutting, or combinations thereof. In some embodiments, the semi-solid electrode slurry can be separated into discrete portions of the current collector 12 by speeding up the current collector at some distance past the dispensing mechanism, causing an uncoated portion of current collector to form between each discrete portion of semi-solid electrode slurry.

In some embodiments, as discussed above, the width of the current collector (the dimension perpendicular to the direction of travel of the current collector through the conveyance system) can be approximately equal to or greater than the width of the current collector to be used in the finished electrode. In some embodiments, the width of the current collector can accommodate separation of the disposed semi-solid electrode slurry into more than one electrode portion width-wise. In other words, in some embodiments, separation of the semi-solid electrode slurry into discrete portions on the current collector 12 can include separation of the semi-solid electrode slurry in two directions (parallel to the direction of travel of the current collector and also perpendicular to the direction of travel of the current collector).

The method 10 further includes cutting the current collector between the discrete portions of semi-solid electrode slurry to form a finished electrode 13. In some embodiments, the current collector can be cut by separating delineated sections of the current collector along pre-perforated extent lines. In some embodiments, the current collector can be cut using a laser (e.g., a CO2-gas laser, high-powered diode laser, fiber optic laser, etc.), drilling, plasma cutting, using a reciprocating blade, using a punch or press, pneumatic cutting, hydraulic cutting, using other methods known to those of skill in the art, or combinations thereof.

In some embodiments, each individualized current collector with the discrete portion of semi-solid electrode slurry disposed thereupon can be considered the finished electrode. In some embodiments, the finished electrode can be disposed onto an electrically insulating material (e.g., laminate pouch material) such that the current collector directly abuts the insulating material. In some embodiments, an adhesive can be used to retain the finished electrode on the insulating material. In some embodiments, as described above, the current collector can be pre-disposed to the insulating material (e.g., pouch material) such that individualization of the current collector material also include cutting the insulating material to form the finished electrode.

In some embodiments, the finished electrode can include an electrode tab electrically connected to the current collector and configured to transport electrons into or out of the electrode. In some embodiments, the electrode tab can extend beyond the current collector and/or the insulating material. In some embodiments, the electrode tab can be electrically coupled to the current collector before the semi-solid electrode slurry is disposed onto the current collector. In some embodiments, the cell can include integrated electrical tabbing, which can obviate the need for (i) a discrete tab component (e.g., an electrical lead), (ii) connecting dedicated tabs to current collectors, and (iii) a dedicated tab sealing operation. Instead, in some embodiments, an electrical tab or lead can be provided as an extension of the current collector integral to the current collector. In some embodiments, the tab or lead can be defined by removal of material from a larger area of current collector material, thereby defining the current collector and the tab or lead.

The method 10 optionally includes joining the finished electrode (e.g., cathode) with a second finished electrode (e.g., anode), interposed with a separator, to form a finished electrochemical cell 14. In other words, once the finished electrode has been individualized (e.g., according to step 13), it can be assembled into the finished electrochemical cell with the second finished electrode exhibiting the opposite redox reaction. In other words, the cathode and the anode can be joined together with a separator disposed between.

In some embodiments, the separator can be disposed between the anode and the cathode. In some embodiments, the separator can be joined to at least one of the anode and the cathode with an adhesive. In some embodiments, one anode, one cathode and one separator can be stacked together to form a unit cell assembly. Each unit cell assembly can also include conductive tabs (also referred to as a lead) to couple the electrodes to external circuits. Multiple unit cell assemblies are then stacked or arrayed together to form a battery cell. In some embodiments, the number of unit cell assemblies in a battery cell may vary depending on, for example, the desired capacity and/or thickness of the resulting battery cell. These stacked unit cell assemblies are electrically in parallel, and respective tabs in each unit cell assembly are typically welded together via welding processes such as resistance welding, laser welding, and ultrasonic welding, seam welding, electric beam welding, among others.

In some embodiments, the prepared electrochemical cell can be vacuum sealed in a prismatic pouch which can provide hermetic isolation of the electrochemical cell materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the electrochemical cell assembly. In some embodiments, during vacuum pouch sealing, electrolyte can be injected into the stacked unit cell assembly and the unit cell assemblies and the electrolyte can then be sealed into a pouch. In some embodiments, no electrolyte is added during the pouch sealing step if the semi-solid electrode slurry may contain the total desired quantity of electrolyte already.

In some embodiments, the sealed battery cell can then be subjected to a formation process, in which an initial charging operation can be performed to create a stable solid-electrolyte-interphase (SEI) that can passivate the electrode-electrolyte interface as well as prevent side reactions. In some embodiments, several cycles of charging and discharging can be carried out to ensure that the capacity of the batteries meets the required specifications. In some embodiments, a degassing step can be performed to release gases introduced or produced during the initial charging stage or during the electrochemical reactions in the battery formation step. The presence of entrapped gas in the electrodes generally reduces the conductivity and density of the electrodes, and limits the amount of active electrochemical materials that can be placed in a battery cell and may cause dendrite growth that can erode battery performance in lithium batteries. In some embodiments, dendrite formation may lead to a reduction in cycle life and a reduction in overall safety performance. In some embodiments, a reseal step can be taken to seal the battery cell again after the entrapped gas is released.

In some embodiments, in comparison with conventional electrochemical cell manufacturing methods, the methods described herein can be used to manufacture semi-solid electrodes and electrochemical cells in a shorter period of time. In some embodiments, the shorter time period can minimize evaporation and/or degradation of the electrolyte, reduce manufacturing cost, and reduce the necessary factory footprint for the same output of electrochemical potential.

Figure 2:
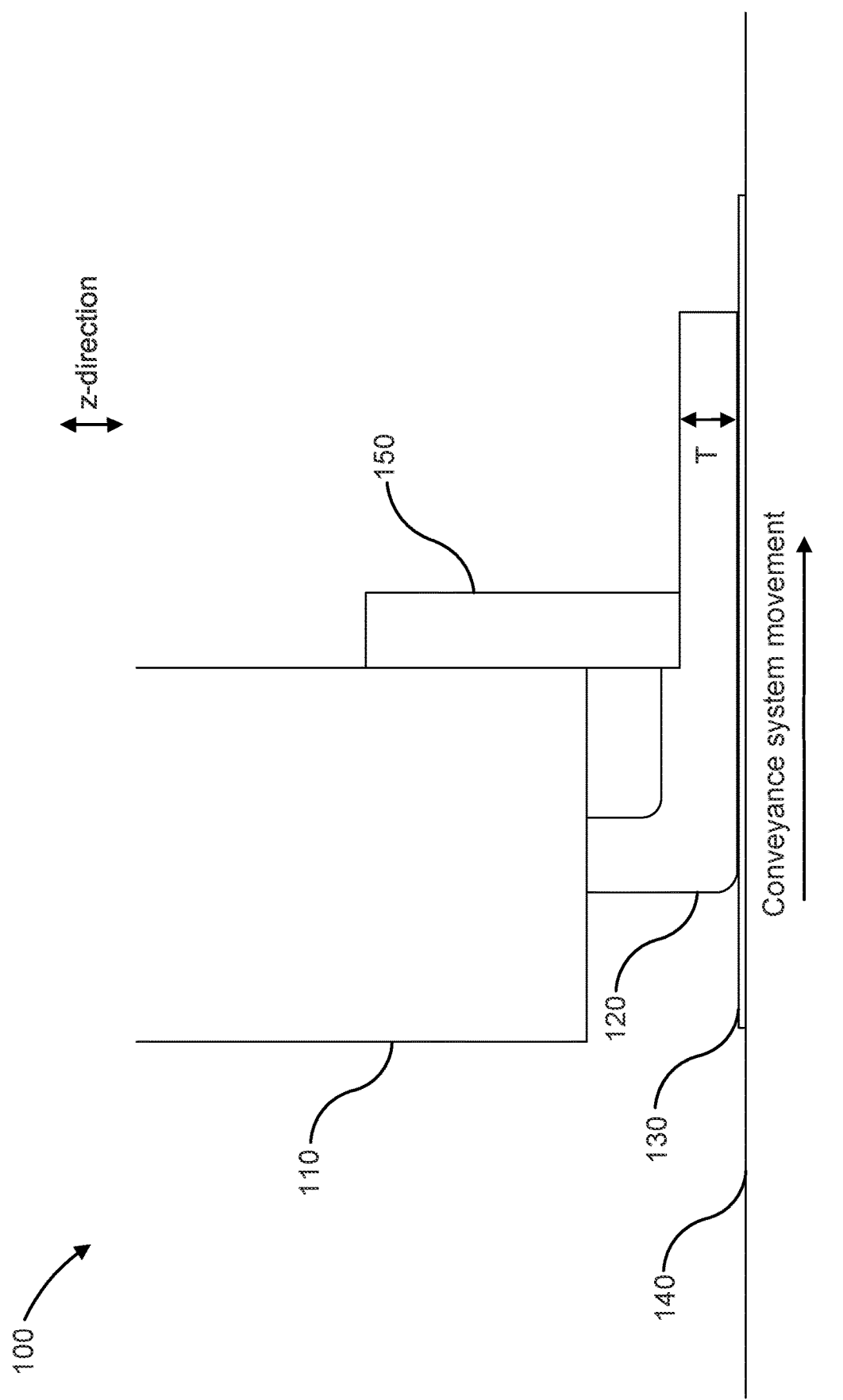
FIG. 2 illustrates a dispensing mechanism, according to an embodiment.

FIG. 2 shows a dispensing mechanism 100 that can control the length of a casting gap T of an electrode, according to an embodiment. In some embodiments, a nozzle 110 can dispense an electrode slurry 120 onto a current collector 130 placed on a conveyance system 140, and the casting gap T can be controlled by movement of a nozzle blade 150. In some embodiments, the casting gap T can be controlled by independent movement of the nozzle blade 150 in the z-direction with respect to the nozzle 110, the current collector 130, and the conveyance system 140. In some embodiments, the casting gap T can be controlled by movement of both the nozzle 110 and the nozzle blade 150 in the z-direction with respect to the current collector 130 and the conveyance system 140.

Figure 3:
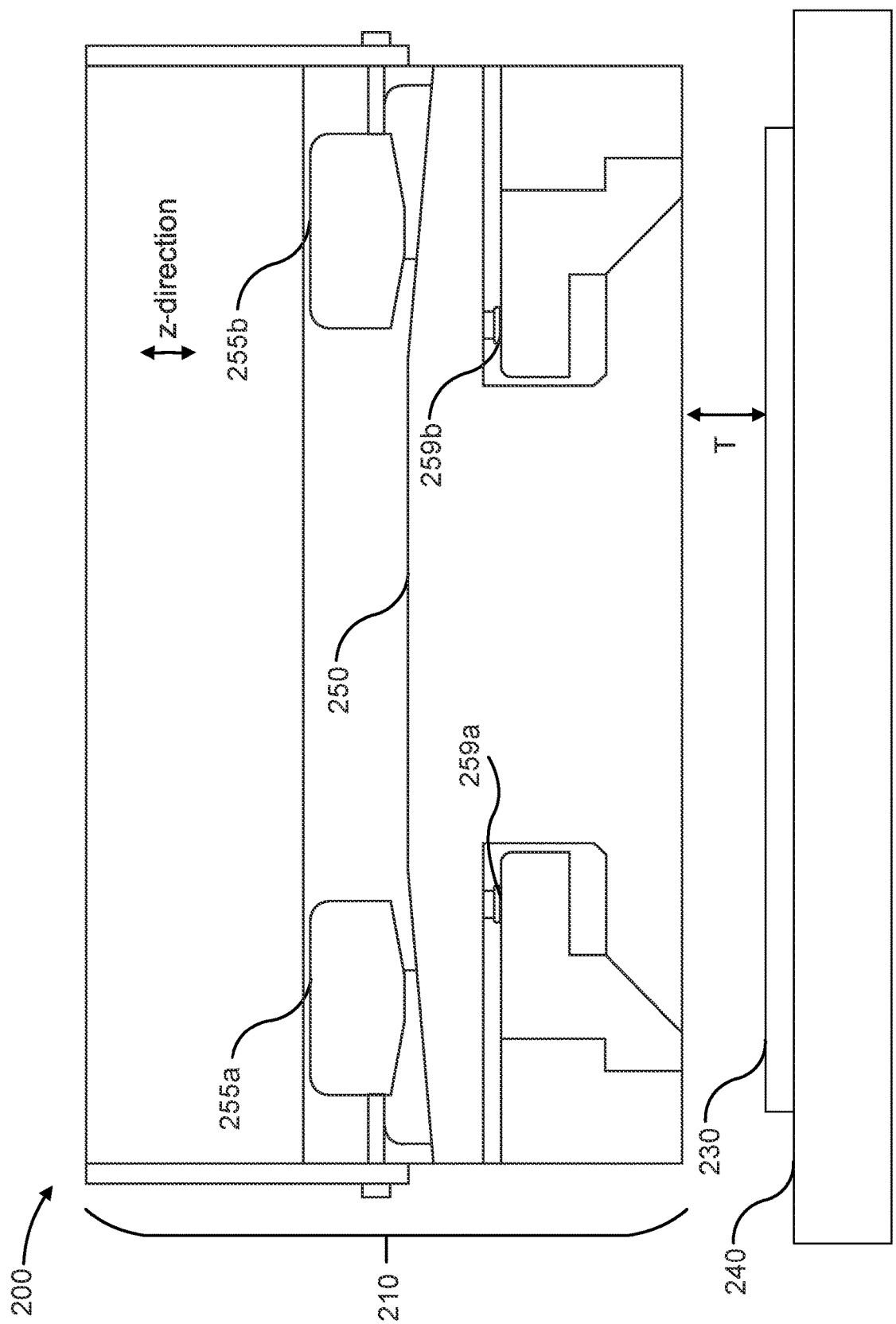
FIG. 3 illustrates a dispensing mechanism, according to an embodiment.

FIG. 3 shows a dispensing mechanism 200 that can control the length of a casting gap T between a nozzle 210 and a current collector 230 on a conveyance system 240, according to an embodiment. In some embodiments, the movement of a nozzle blade 250 in the z-direction can be controlled by set of rollers 255. The rollers 255 can be pushed in from either side by a servo system (not shown), that can push the nozzle blade 250 downward on either the left side, the right side, or throughout the entire width of the nozzle blade 250. In some embodiments, only the left roller 255a can be engaged to lower the nozzle blade 250 on the left side only, such that the left side of the nozzle blade 250 is lower than the right side of the nozzle blade 250. In some embodiments, only the right roller 255b can be engaged to lower the nozzle blade 250 on the right side only, such that the right side of the nozzle blade 250 is lower than the left side of the nozzle blade 250. In some embodiments, both the left roller 255a and the right roller 255b can be engaged to lower the nozzle blade 250 along its entire width. In some embodiments, a set of springs 259 can provide a force to return the nozzle blade 250 back to its original position after lowering.

Figure 4:
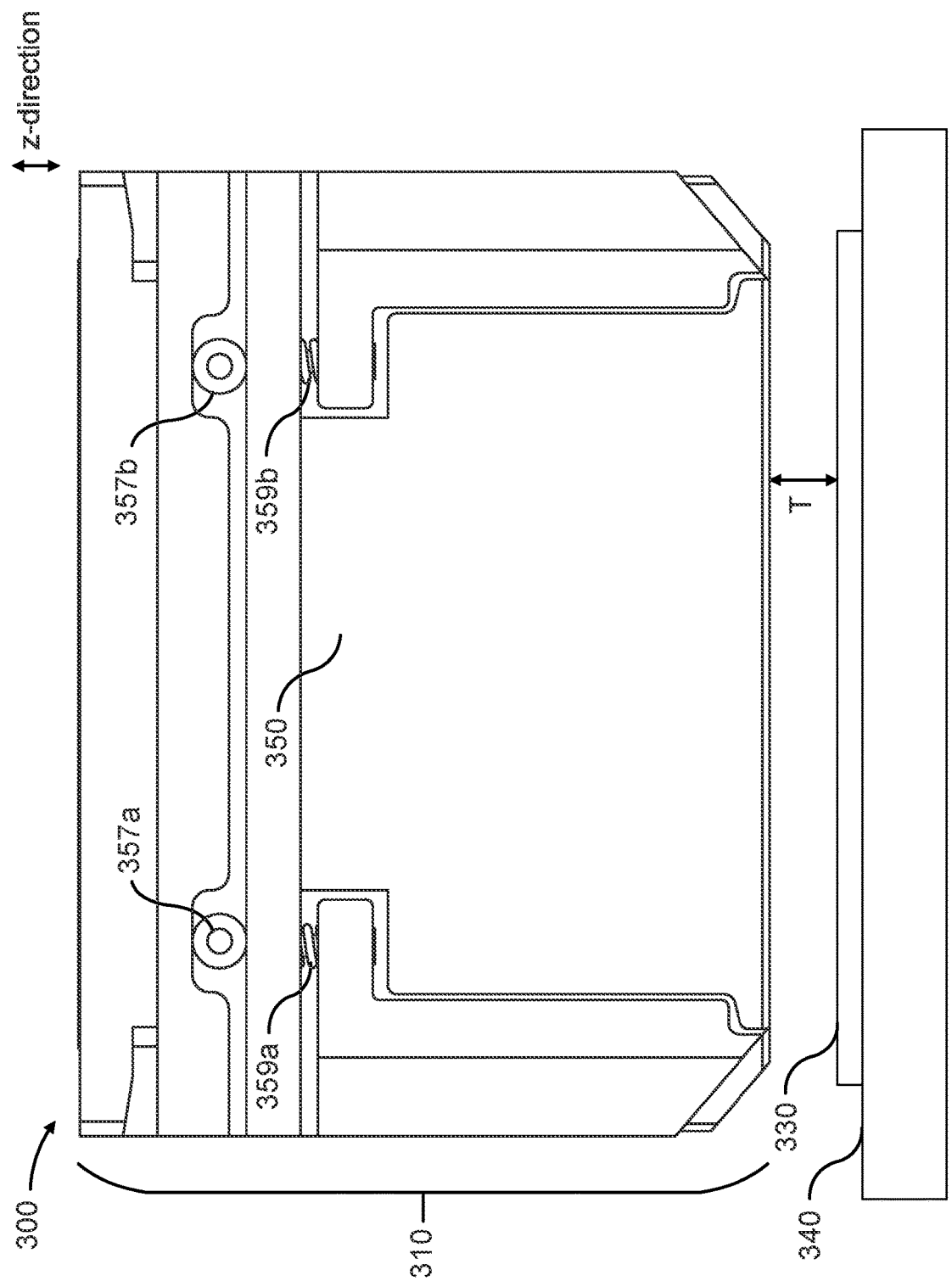
FIG. 4 illustrates a dispensing mechanism, according to an embodiment.
Figure 5:
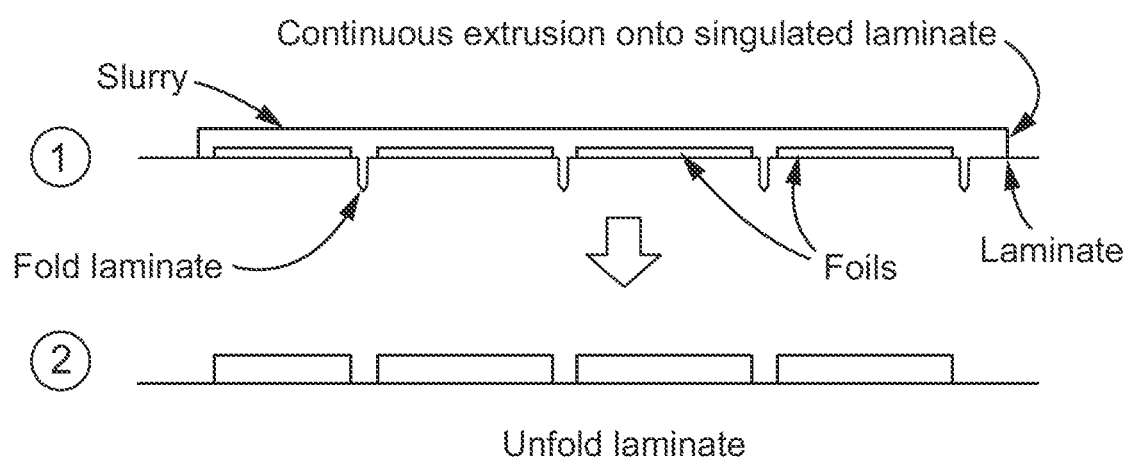
FIG. 5 illustrates a process for manufacturing an electrode, according to an embodiment.

FIG. 4 shows a dispensing mechanism 300 that can control the length of a casting gap T between a nozzle 310 and a current collector 330 on a conveyance system 340, according to an embodiment. In some embodiments, the movement of a nozzle blade 350 in the z-direction can be controlled by a set of cams 357. The cams 357 can be controlled by a set of camshafts (not shown), that can rotate to push the nozzle blade 350 downward on either the left side, the right side, or throughout the entire width of the nozzle blade 350. In some embodiments, only the left cam 357a can be engaged to lower the nozzle blade 350 on the left side only, such that the left side of the nozzle blade 350 is lower than the right side of the nozzle blade 350. In some embodiments, only the right cam 357b can be engaged to lower the nozzle blade 350 on the right side only, such that the right side of the nozzle blade 350 is lower than the left side of the nozzle blade 350. In some embodiments, both the left cam 357a and the right cam 357b can be engaged to lower the nozzle blade 350 along its entire width. In some embodiments, a set of springs 359 can provide a force to return the nozzle blade back to its original position after lowering.

Tucking Method

FIGS. 5-8 illustrate methods of manufacturing a semi-solid electrode in a continuous or semi-continuous manner. In some embodiments, the current collector material can be moved continuously from a current collector feed device, onto a conveyor, and past a dispensing mechanism. In some embodiments, the current collector material can be moved continuously by way of a conveyor system. In some embodiments, the conveyor system can include a series of plates that are configured to be moved parallel and/or perpendicular to the direction of travel of the conveyor. As used herein, plates refers to a plurality of planar structures configured to be moved with respect to the direction of travel of the conveyor system and can also be pallets, sheets, covers, films, or other suitable structures. In some embodiments, the conveyor system can include a shuttle conveyor, a wire belt conveyor, a belt conveyor, a perforated conveyor, a spreading conveyor, a roller conveyor, a chain conveyor, or combinations thereof.

In some embodiments, a vacuum belt conveyor can be used to convey the current collector material through the manufacturing system. Vacuum belt conveyors typically include a perforated belt and slider bed with a conveyor frame that is sealed. In that way, air can be drawn through the holes of the frame, creating a partial vacuum. Vacuum belt conveyors can be used to convey light and/or flat materials such that the materials are held against the conveyor belt. Vacuum belt conveyors can be used to convey light and/or flat materials at higher speeds, which can increase the manufacturing rate. In some embodiments, the vacuum belt conveyor can be used to convey light and/or flat materials in a non-horizontal orientation, for example, vertically.

Figure 6B:
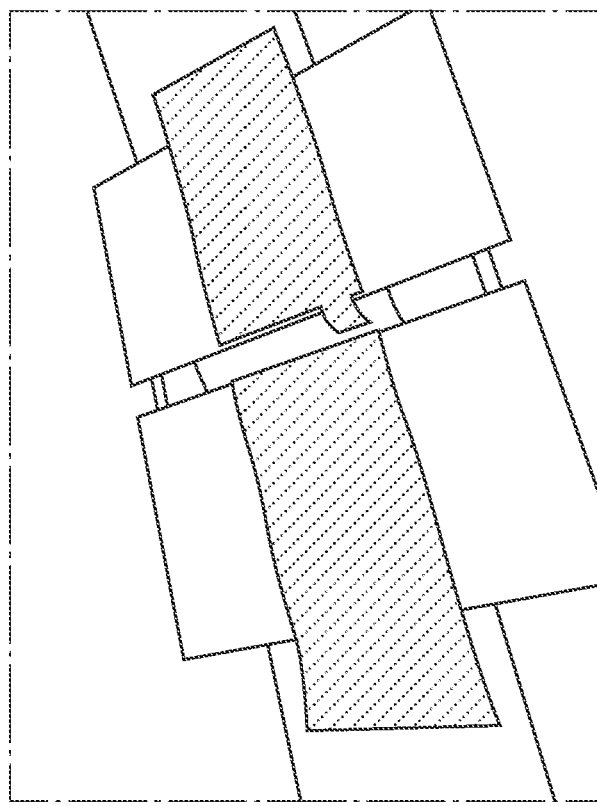
FIG. 6B is a photograph of the current collector of FIG. 3A after moving the two plates apart to uncover the tucked portion of the current collector, according to an embodiment.
Figure 6A:
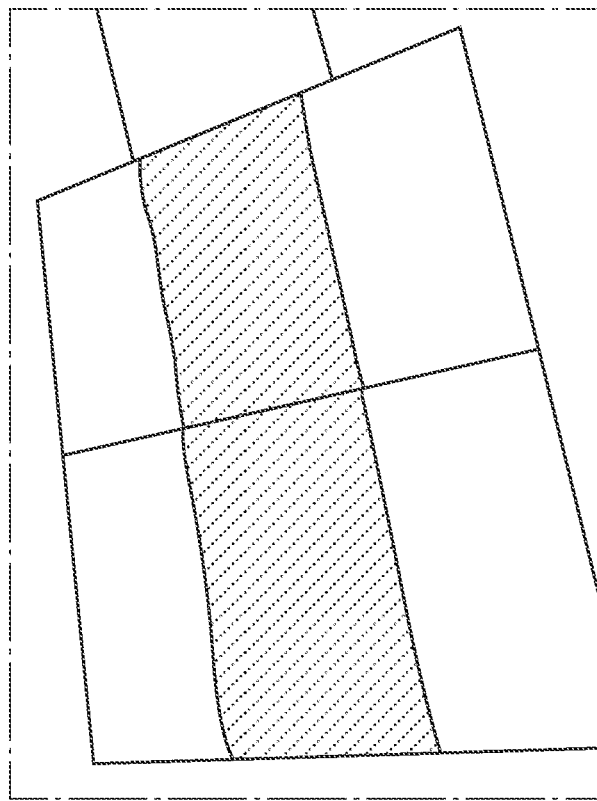
FIG. 6A is a photograph of a semi-solid electrode slurry deposited onto a moving current collector having a portion of the current collector tucked between two plates, according to an embodiment.

In some embodiments, as shown in FIGS. 6A and 6B, a portion of the continuous current collector can be interposed, tucked, pleated, folded, gathered, creased, doubled over, grouped, collected, hidden, and/or otherwise excluded from deposition of electrode slurry material onto the continuous current collector. In other words, in some embodiments, a discrete portion or a plurality of discrete portions of the continuous current collector can be isolated and excluded from receiving the electrode slurry material.

In some embodiments, a portion of the continuous current collector can be moved in a direction perpendicular to the direction of travel of the continuous current collector. In some embodiments, after moving a portion of the current collector away from the plane of travel (e.g., downward), the two edges of the interposed portion of the current collector can be moved together to fully isolate the interposed portion of the current collector.

In some embodiments, the continuous current collector can be moved across a series of abutted plates configured to open and close during continuous or semi-continuous manufacturing. In some embodiments, the plates can be configured to be approximately the size of the finished electrochemical cell to minimize waste of semi-solid electrode slurry material. In some embodiments, the plates can be perforated or otherwise configured to be able to draw vacuum across the surface of the plates such that materials can be retained on the surface regardless of the orientation of the plates. In some embodiments, the plates can be attached to a rotary system such that plates can accommodate current collector at one end of a conveyor line, convey the current collector during deposition of the electrode material onto the current collector, and can then be diverted back to the beginning of the conveyor line. In some embodiments, the plates can be washed or otherwise conditioned for reuse between the end of the conveyor line and the beginning of the conveyor line.

Figure 7:
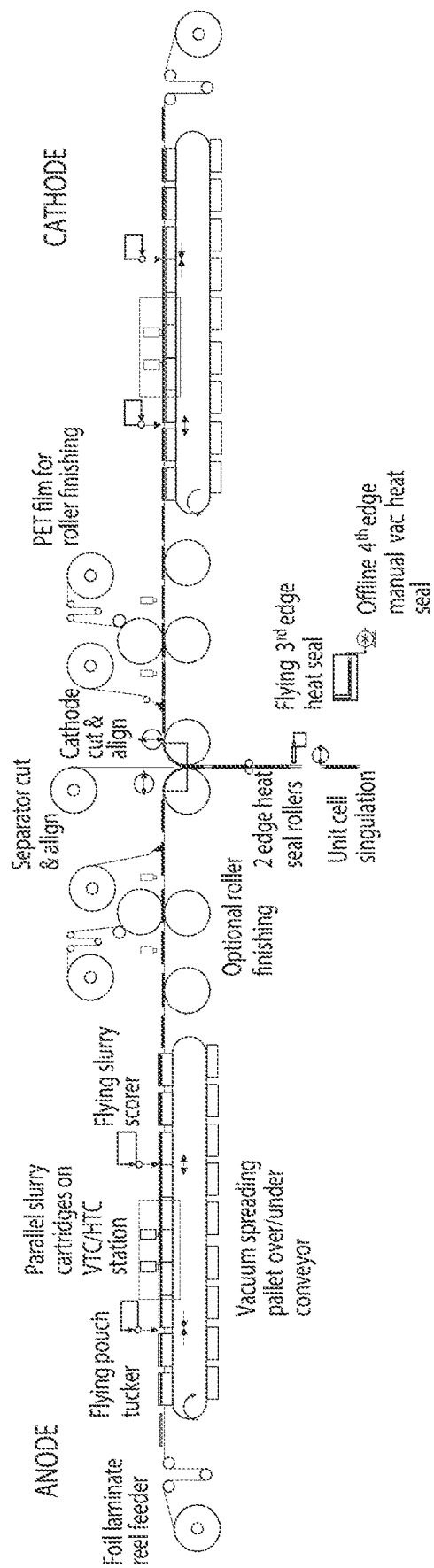
FIG. 7 is a schematic diagram of a system for semi-continuous or continuous manufacture of a semi-solid electrode, according to an embodiment.
Figure 8:
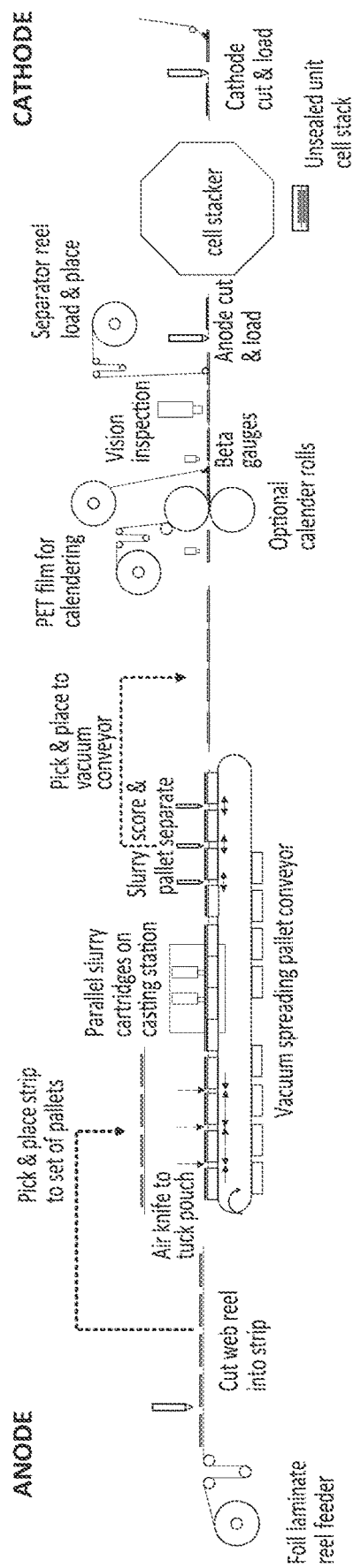
FIG. 8 is a schematic diagram of a system for semi-continuous or continuous manufacture of a semi-solid electrode, according to an embodiment.

In some embodiments, the method of continuously or semi-continuously manufacturing a semi-solid electrode can include a first step in which the plates can be initially open as the continuous current collector is disposed upon the plates. In some embodiments, as shown in FIGS. 7 and 8, the continuous current collector (i.e., foil) can be fed from a reel feeder, across one or more rollers, and onto a conveyor. In some embodiments, the continuous current collector can be substantially similar to the continuous current collector described above, with respect to FIG. 1.

In some embodiments, in a second step, a portion of the continuous current collector can be disposed (e.g., interposed or tucked) between two open plates by any suitable method, including but not limited to an extending rod, an air knife, a tucking wire, or any other suitable method. In some embodiments, the continuous current collector can be slowed, paused, or stopped in order to facilitate the disposition of the portion of the continuous current collector between the two open plates. In some embodiments, the continuous current collector can be moved nonstop and disposition of the portion of the continuous current collector between the two open plates can be carried out on-the-fly. In some embodiments, a flying tucking device can be used, which can be configured to move at substantially the same speed as the continuous current collector while causing the interposition of the portion of the continuous current collector between the plates. In some embodiments, a fixed tucking device can be used that is configured to tuck the portion of the continuous current collector between the plates as the continuous current collector moves past the fixed tucking device. In some embodiments, a computer vision system can be configured to monitor the tucking step and control precisely the tucking device, the movement of the plates, and the timing of the tucking and untucking. In some embodiments, the computer vision system can be a closed loop computer vision system including a video camera, a processor, a memory, a power supply, and a computer-readable media configured to provide processing feedback to an automated manufacturing system.

In some embodiments, in a third step, the two open plates can be moved into a closed configuration where the two plates substantially abut one another and the interposed portion of the continuous current collector is retained between the two plates. In some embodiments, the closure of the plates can hold the interposed portion of the continuous current collector between the plates. In some embodiments, plates can have a securing edge such that the securing edge of one plate can directly abut the securing edge of the adjacent plate to frictionally engage the current collector. In some embodiments, the securing edge can include a material that deforms to some extent when the plates close, which can increase how securely the portion of the continuous current collector is held between the plates in the third and fourth steps.

In some embodiments, in a fourth step, the semi-solid electrode slurry can be disposed onto the continuous current collector by a dispensing mechanism. As shown in FIG. 6A, the disposed semi-solid electrode slurry can be disposed onto the continuous current collector without being disposed onto the interposed portion of the continuous current collector. In some embodiments, the deformable securing edge may help reduce or eliminate the loss of semi-solid electrode slurry onto the portion of the continuous current collector interposed between the two plates.

In some embodiments, the dispensing mechanism can be a nozzle configured to dispense the semi-solid electrode slurry at a predetermined and precise rate onto specific regions of the current collector as it is passes the dispensing mechanism. In some embodiments, the semi-solid electrode slurry can be configured to remain in predetermined regions once dispensed onto the current collector.

In some embodiments, as shown in FIG. 7, the semi-solid electrode slurry can be disposed continuously or semi-continuously onto the current collector using parallel vertical tape casting/hybrid tape casting (VTC/HTC) stations including parallel slurry cartridges. In some embodiments, as shown in FIG. 8, the semi-solid electrode slurry can be disposed continuously or semi-continuously onto the current collector using a casting station.

In some embodiments, as shown in FIG. 8, the continuous current collector can be cut to obtain a current collector having the dimensions of the desired current collector in the finished electrode. In some embodiments, the individual current collectors can be picked up from the web reel and placed onto the conveyor system described above with regard to FIG. 5. In some embodiments, the individual current collectors can be placed directly onto the plates, the plates configured to open and close to eliminate and then create a distance between each current collector. In some embodiments, the individual current collectors can be picked up from the web reel and placed onto a pouch material, the pouch material configured to become at least some part of the insulated outer coating of the finished electrochemical cell. In some embodiments, the pouch material can be a continuous pouch material, and can be fed from a roller onto the plates. Without wishing to be bound by any particular theory, it may make it easier to move and handle the thin current collectors when they are disposed to (e.g., coupled to) the pouch material rather than being handled individually. In some embodiments, the pouch material with the individual current collectors disposed to the surface thereof can be fed onto a conveyor including plates, the plates being in the open configuration. In some embodiments, the plates can be positioned and configured such that only pouch material (no current collector material) extends beyond the extent of a plate. In some embodiments, a tucking device (e.g., the flying tucker described herein) can be used to dispose a portion of the pouch material between two plates, the plates configured to be moved into the closed configuration to secure the portion of the pouch material therebetween. In some embodiments, when the portion of the pouch material is disposed between two plates and isolated by closing the plates, the only surface of the pouch material remaining on the plates is pouch material with the current collector coupled to the pouch material. In other words, the individual current collectors are coupled to the pouch material with a portion of current collector material between, the portion of current collector is interposed between the plates, and the remaining surface is a continuous surface of current collector. In some embodiments, the semi-solid electrode slurry can then be disposed onto the current collector in a continuous or semi-continuous manner and the plates can be opened to separate the individual finished electrodes.

In some embodiments, in an optional fifth step, the dispensed semi-solid electrode slurry can be spread out to a particular thickness across the continuous current collector, for example, using a doctor blade, a roller, a calendering process, a moving press, or combinations thereof. In some embodiments, the semi-solid electrode slurry can be deposited onto a subset of the current collector (e.g., in the middle of the continuous current collector). In some embodiments, the optional fifth step can be carried out at an elevated temperature. In some embodiments, a plastic film (e.g., polyethylene terephthalate film) can be disposed onto the semi-solid electrode slurry before the calendering step such that the semi-solid electrode slurry remains substantially disposed on the current collector rather than sticking to a calendering roller or other calendering device.

In some embodiments, in a sixth step, the plates can be opened to expose the interposed portion of the continuous current collector and separate the discrete portions of semi-solid electrode slurry on the continuous current collector. In some embodiments, the plates can be opened by manually forcing the plates opening and/or by speeding up the continuous current collector. In some embodiments, as shown in FIG. 6B, the discrete portions of semi-solid electrode slurry can be configured to have well structured (i.e., clean or straight) lines on two or more sides of the discrete portion of the semi-solid electrode slurry. In some embodiments, each discrete portion of the semi-solid electrode slurry on the current collector can be considered an electrode for an electrochemical cell.

In some embodiments, before opening the plates to expose the discrete portions of the semi-solid electrode slurry, a scoring device can be used to score the semi-solid electrode slurry. In some embodiments, the scoring device can be used to score the semi-solid electrode slurry at a location corresponding generally to the interface between the plates to aid in clean separation of the semi-solid electrode slurry when the plates open. In some embodiments, the scoring mechanism can include a tensioned wire. In some embodiments, the tensioned wire can be heated or vibrated to aid in scoring of the semi-solid electrode slurry. In some embodiments, the scoring mechanism can include a moving blade. In some embodiments, the scoring mechanism can include a directed fluid or air jet. In some embodiments, the scoring device can include an ultrasonic knife configured to separate the semi-solid electrode slurry into discrete portions. In some embodiments, the action of opening the plates can separate the discrete portions of the semi-solid electrode slurry without the need for a scoring device. In some embodiments, the plates can be moved into the open configuration by moving one of the plates away from the other, the other plate remaining in a fixed relative position. In some embodiments, the plates can be moved into the open configuration by moving both plates away from the other concurrently. In some embodiments, the plates can be moved into the open configuration by moving first one interfacing corner of the plate away from the corresponding corner of the opposite plate and then subsequently moving the other interfacing corner of the plate away from the second corresponding corner of the opposite plate. In other words, plates can be rotated away from adjacent plates if doing so is helpful for creating a clean break of the semi-solid electrode slurry.

In some embodiments, in a seventh step, the current collector can be cut perpendicular to the direction of travel of the current collector between each discrete portion of semi-solid electrode slurry to form individual electrodes. In some embodiments, the current collector can be cut using a laser (e.g., a CO2-gas laser, high-powered diode laser, fiber optic laser, etc.), drilling, plasma cutting, using a reciprocating blade, using a punch or press, pneumatic cutting, hydraulic cutting, using other methods known to those of skill in the art, or combinations thereof. In some embodiments, as shown in FIG. 8, individual electrodes can be picked up from the conveyor (e.g., using a robotic arm) and placed onto a different conveyor. In some embodiments, if the finished electrode is not already coupled to the pouch material, the individual electrodes can be coupled to the pouch material in this step. In some embodiments, the individual electrode can optionally be calendered to reduce the thickness of the semi-solid electrode slurry on the current collector and/or to reduce defects. In some embodiments, a beta gauge such as a moving web thickness and/or weight measurement system can be used to ensure proper and consistent z-directional thickness of the semi-solid electrode slurry on the current collector. In some embodiments, a video camera and computer processor can be used to visually inspect the finished electrodes and discard any defective electrodes, e.g., using a computer vision program.

This design provides for an electrochemical cell to adopt various form factors, which allows an electrochemical cell to be constructed into specialized shapes and sizes for particular applications. In some embodiments, the shape and design of cathode and anode may determine that of the resulting battery. In some embodiments, the use of varying electrode material, e.g., semi-solid constituents, separator, and compartment volumes determine the battery's power and energy capabilities.

In some embodiments, in an optional eighth step, the individualized electrode (e.g., cathode) can be paired with the separator and a second individualized electrode (e.g., anode) to form the electrochemical cell. In some embodiments, the formed electrochemical cell can be sealed on at least one edge within a pouch material. In some embodiments, the formed electrochemical cell can be sealed on at least two edges within a pouch material. In some embodiments, the formed electrochemical cell can be sealed on at least three edges within a pouch material. In some embodiments, the formed electrochemical cell can be sealed on at least four edges within a pouch material. In some embodiments, the semi-solid electrode slurry can include less of an electrolyte than the quantity of electrolyte that the finished electrode will include when finally formed. In some embodiments, at least a portion of the electrolyte can be added during or after the eighth step. In some embodiments, after sealing the electrochemical cell into the pouch material, the electrochemical cell can be cycled through one or more charge/discharge cycles. In some embodiments, after the initial cycling of the electrochemical cell, the pouch material can be punctured in order to release any gases formed during initial cycling. In some embodiments, after degassing of the sealed electrochemical cell pouch, the pouch can be resealed along the fourth edge using a heat sealer.

Tucking Plus Masking Material

In some embodiments, a continuous or semi-continuous method for manufacturing the semi-solid electrode can include a combination of one of the methods described above with regard to FIGS. 5-8 and an additional step of physically disposing a portion of the current collector between two plates to define at least one edge of the finished electrode. In some embodiments, such a hybrid method can include a first step in which the plates can be initially open as the continuous current collector is disposed onto the plates. In some embodiments, the continuous current collector can be fed from a reel feeder, across one or more rollers, and onto a conveyor. In some embodiments, the continuous current collector can be substantially similar to the continuous current collector described above, with respect to FIG. 1.

In some embodiments, in a first step, a portion of the continuous current collector can be disposed (e.g., interposed or tucked) between two open plates, for instance using an air knife.

In some embodiments, in a second step, the two open plates can be moved into a closed configuration where the two plates substantially abut one another and the interposed portion of the continuous current collector is retained between the two plates. In some embodiments, the closure of the plates can hold the interposed portion of the continuous current collector between the plates.

In some embodiments, in a third step, a masking material can be disposed onto the exposed portion of the continuous current collector to protect at least a portion of the current collector from receiving a coating of the semi-solid electrode slurry and to define at least one edge of the current collector. In some embodiments, the edge of the current collector can be defined by limiting the extents of where the semi-solid electrode slurry can be coated. In some embodiments, the masking material can be initially stored in a rolled state and can be fed onto the current collector by a mask material dispensing system.

In some embodiments, the masking material can be applied in a direction parallel to the direction of travel of the continuous current collector. In some embodiments, the masking material can be applied before the portion of the current collector is interposed between the two plates. In other words, the masking material can be applied to the current collector and then a portion of both the current collector and the masking material can be interposed between the two plates. While the interposition of the already masked current collector has the potential to cause damage to or misalignment of the masking material, it can also secure the masking material during deposition of the semi-solid electrode slurry onto the masked, interposed current collector.

In some embodiments, the masking material can be applied to the continuous current collector after the continuous current collector is unspooled from a feed reel or similar device but before the semi-solid electrode slurry is disposed onto the current collector. In some embodiments, the masking material can be applied to the continuous current collector before it is spooled onto the feed reel or similar device.

In some embodiments, in a fourth step, the semi-solid electrode slurry can be disposed onto the masked, partially interposed continuous current collector by a dispensing mechanism. In some embodiments, the disposed semi-solid electrode slurry can be disposed onto the continuous current collector without being disposed onto the interposed portion of the continuous current collector. In some embodiments, some of the semi-solid electrode slurry material disposed onto the current collector may also be disposed onto the masking material. In some embodiments, the abutment of the plates may help reduce or eliminate the loss of semi-solid electrode slurry onto the portion of the continuous current collector interposed between the two plates.

In some embodiments, in a fifth step, the masking material can be removed from the current collector surface before moving the two plates into the open configuration. The removed masking material can be connected to a mask material recovery system. In some embodiments, the mask material recovery system can include a subsystem for cleaning any accumulated semi-solid electrode slurry off the masking material. In some embodiments, the masking material can be removed from the current collector surface after moving the two plates into the open configuration. In some embodiments, the masking material can be a closed loop system such that after the masking material is used and cleaned, it can be reused in the same manufacturing process. In other words, the masking material can be cleaned and returned to the beginning of the electrode manufacturing process to be applied to the current collector. In some embodiments, a more durable masking material can be used in order for the life of the masking material to make its use cost-effective.

In some embodiments, in a sixth step, the plates can be opened to expose the interposed portion of the continuous current collector. In some embodiments, opening the plates can also separate the discrete portions of semi-solid electrode slurry on the continuous current collector. In some embodiments, the plates can be opened by mechanical action on the plates. In some embodiments, the plates can be opened, at least in part, by speeding up the conveyance speed of the continuous current collector. In some embodiments, as shown in FIG. 6B, the discrete portions of semi-solid electrode slurry can be configured to have well-structured (i.e., clean or straight) lines on two or more sides of the discrete portion of the semi-solid electrode slurry. In some embodiments, each discrete portion of the semi-solid electrode slurry on the current collector can be considered an electrode for an electrochemical cell.

Continuous Method

Figure 9:
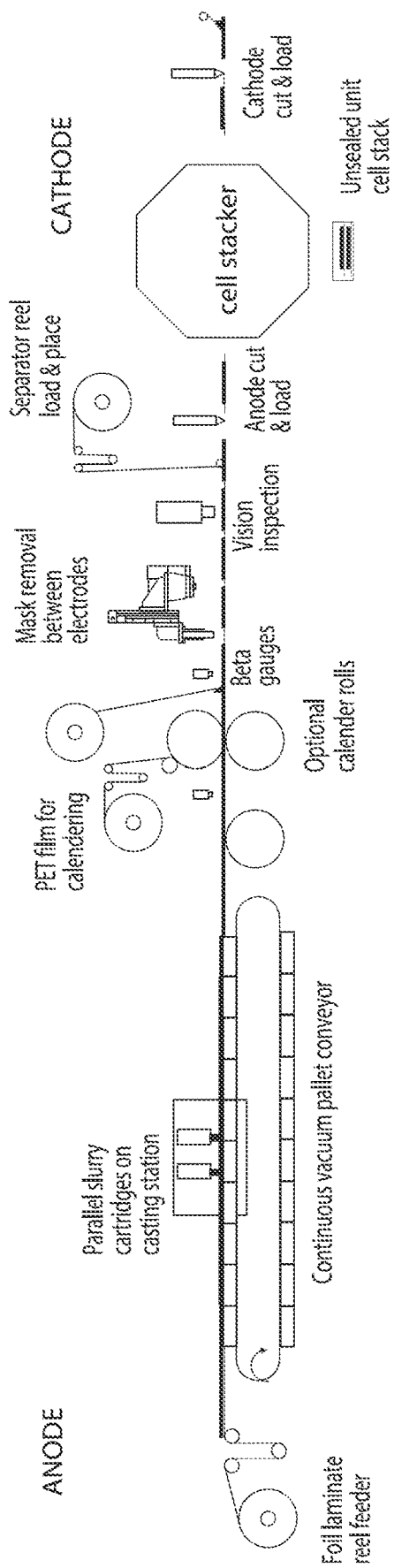
FIG. 9 is a schematic diagram of a system for semi-continuous or continuous manufacture of a semi-solid electrode, according to an embodiment.
Figure 10:
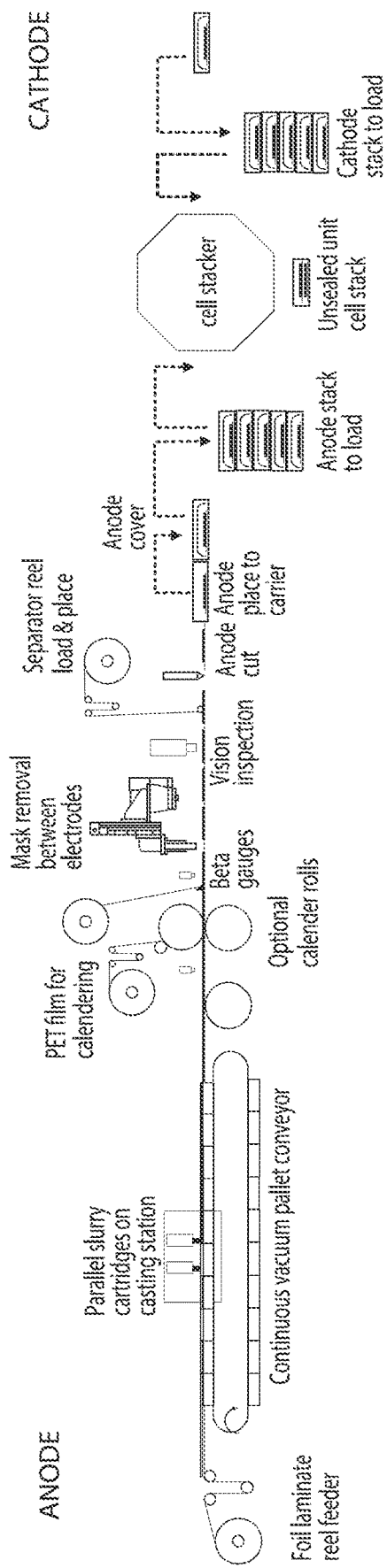
FIG. 10 is a schematic diagram of a system for semi-continuous or continuous manufacture of a semi-solid electrode, according to an embodiment.
Figure 11:
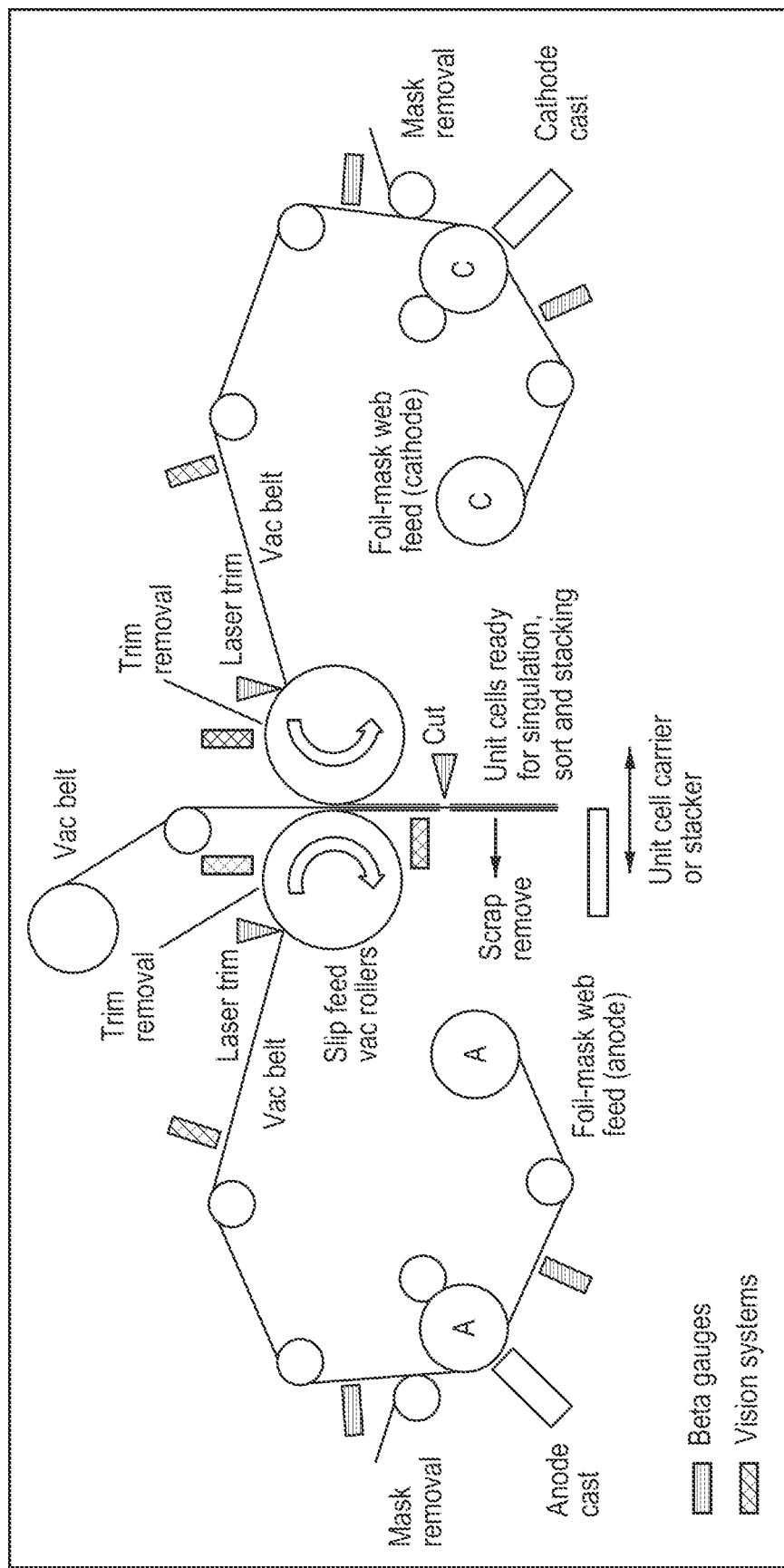
FIG. 11 is a schematic diagram of a system for semi-continuous or continuous manufacture of a semi-solid electrode, according to an embodiment.

FIGS. 9-11 illustrate methods of manufacturing a semi-solid electrode in a continuous manner by covering or otherwise protecting a portion of the continuous current collector from being coated by the semi-solid electrode slurry. In some embodiments, the continuous current collector can be protected by the prior application of masking material. In some embodiments, the masking material can be applied onto the continuous current collector before it is loaded onto the current collector feed device configured to feed the current collector to the conveyor, e.g., a reel feeder.

In some embodiments, the masking materials can be printed onto the current collector such that it is permanently disposed to the current collector. In some embodiments, the masking material can be printed onto the current collector during the manufacture of the current collector.

In some embodiments, the masking material can be applied to the continuous current collector after it is unspooled from the current collector feed device but before the semi-solid electrode slurry is disposed to the masked current collector.

In some embodiments, the masking material can include any suitable material configured to removably adhere to the current collector at the range of temperatures and conditions experienced during manufacturing. In some embodiments, the masking material can be made from a polymer, a cross-linking agent, a thermoplastic polymer, polyimides, a nonwoven synthetic material, an extruded thermoforming material, a paper, a metal, a natural fiber, or combinations thereof. In some embodiments, the masking material can include an adhesive, such as a rubber-based adhesive, an acrylic-based adhesive, or a silicone-based adhesive.

In some embodiments, the masking material can be applied in a direction parallel and/or perpendicular to the direction of travel of the continuous current collector. In some embodiments, the masking material applied in the perpendicular direction can be applied separately from the masking material applied in the parallel direction. In some embodiments, the masking material can include a web structure such that the masking material in both the parallel direction and the perpendicular direction are included in one material and applied at the same time.

In some embodiments, at least partially because the plates do not need to be moved between the open and closed configuration, this manufacturing process can be substantially fully continuous. In some embodiments, the conveyor system can be used to move the masked current collector past the dispensing mechanism, e.g., slurry casting station. Without wishing to be bound by any particular theory, because the current collector is at least partially masked, the slurry casting rate can be increased substantially, at least to a point, without a trade-off of less precise, crumbling electrode edges.

In some embodiments, the semi-solid electrode slurry can be applied onto the masked current collector using an engineered nozzle configured to apportion the slurry precisely onto the current collector. In some embodiments, the deposition of semi-solid electrode slurry here can be substantially similar to methods described above with respect to FIG. 1.

In some embodiments, once the semi-solid electrode slurry is disposed onto the masked current collector, the manufacturing process can include an optional slurry-spreading step. In some embodiments, slurry spreading can be carried out using a roller or a series of rollers. In some embodiments, a doctor blade or other similar device can be used to remove excess slurry material from the masked current collector.

In some embodiments, once the slurry has been spread out substantially evenly on the current collector, the surface velocity of the current collector along the conveyor can be increased to create a slight gap between the formed electrodes. In some embodiments, the gap created between formed electrodes can be between about 100 µm and about 15 mm, between about 250 µm and about 10 mm, between about 500 µm and about 9 mm, between about 750 µm and about 8 mm, between about 1 mm and about 7 mm, between about 2 mm and about 6 mm, or between about 3 mm and about 5 mm, inclusive of all values and ranges therebetween. In some embodiments, the gap created between formed electrodes can be greater than about 100 µm, 250 µm, 500 µm, 750 µm, 1 mm, 2 mm, 3 mm, 4 mm, 5 mm, 6 mm, 7 mm, 8 mm, 9 mm, 10 mm, or 15 mm, inclusive of all values and ranges therebetween.

In some embodiments, the formed electrodes can be calendered by passing the formed electrodes between two or more rollers to compress and optionally heat the formed electrodes. In some embodiments, the formed electrodes can be calendered to a particular density, for example greater than about 1 g/cm3, 1.5 g/cm3, 1.75 g/cm3, 2 g/cm3, 2.25 g/cm3, 2.5 g/cm3, 2.75 g/cm3, 3 g/cm3, 3.25 g/cm3, 3.5 g/cm3, 3.75 g/cm3, or greater than about 4 g/cm3, inclusive of all values and ranges therebetween. Without wishing to be bound by any particular theory, among other outcomes, calendering of the electrodes may result in a desired porosity reduction (increase in energy density), a homogenization of the z-direction thickness, and/or a decrease in contact resistance at the current collector—electrode interface.

In some embodiments, the calendering process can result in a semi-solid electrode having a porosity of less than about 99% of the porosity of the non-calendered semi-solid electrode, less than about 95%, 90%, 85%, 80%, 75%, 70%, 65%, 60%, 55%, or less than about 50%, inclusive of all values and ranges therebetween. In some embodiments, reduction in porosity to less than about 60% of the non-calendered semi-solid electrode may result in tears or other defects to the semi-solid electrode and/or current collector.

In some embodiments, the calendering process can result in a semi-solid electrode having a raw porosity of less than about 50%, 45%, 40%, 35%, 30%, 25%, 20%, 19%, 18%, 17%, 16%, 15%, 14%, 13%, 12%, 11%, 10%, 9%, 8%, 7%, 6%, or less than about 5%, inclusive of all values and ranges therebetween.

In some embodiments, after calendering, the finished electrode including the current collector and the semi-solid electrode slurry can have a z-direction thickness of less than about 2,000 µm, less than about 1,500 µm, less than about 1,000 µm, less than about 750 µm, less than about 500 µm, less than about 250 µm, less than about 200 µm, less than about 150 µm, less than about 100 µm, less than about 75 µm, less than about 50 µm, or less than about 25 µm, inclusive of all values and ranges therebetween. In some embodiments, the finished electrode including the current collector and the semi-solid electrode slurry can have a z-direction thickness of between about 25 µm and about 2,000 µm, about 25 µm and about 1,500 µm, about 50 µm and about 1,000 µm, about 75 µm and about 750 µm, or about 100 µm and about 500 µm, inclusive of all values and ranges therebetween.

In some embodiments, after the formed electrodes have been optionally calendered, the mask material can be removed from the continuous current collector. In some embodiments, the mask material can be connected to a mask material recovery system, the mask material recovery system configured to force the removal of the masking material from the continuous current collector. In some embodiments, the removal of the masking material from the continuous current collector can be carried out in a controlled manner such that the masking material does not remove any of the semi-solid electrode slurry from the formed electrode. In some embodiments, the mask material recovery system can include a subsystem for cleaning any accumulated semi-solid electrode slurry off the masking material.

In some embodiments, the removal of the masking material can create a gap between each formed electrode. In some embodiments, the gap created between each formed electrode may be sufficient to allow for clean separation of each discrete formed electrode on the continuous current collector. In some embodiments, the gap created between each formed electrode may be sufficient to allow for cutting of the continuous current collector to form individual electrodes.

In some embodiments, the current collector can be cut perpendicular to the direction of travel of the current collector between each discrete portion of semi-solid electrode slurry to form individual electrodes. In some embodiments, the current collector can be cut using a laser (e.g., a CO2-gas laser, high-powered diode laser, fiber optic laser, etc.), drilling, plasma cutting, using a reciprocating blade, using a punch or press, pneumatic cutting, hydraulic cutting, using other methods known to those of skill in the art, or combinations thereof. In some embodiments, as shown in FIG. 8, individual electrodes can be picked up from the conveyor (e.g., using a robotic arm) and placed onto a different conveyor. In some embodiments, if the gap created between each formed electrode is insufficient after cutting the continuous current collector, the speed of the conveyor can be increased past a particular point in order to create more space between adjacent formed electrodes.

In some embodiments, if the finished electrode is not already coupled to the pouch material, the individual electrodes can be coupled to the pouch material in this step. In some embodiments, the individual electrodes can be coupled to the pouch material by heating at least a portion of the pouch material to fuse the pouch material to the current collector. In some embodiments, an adhesive can be used to adhere the pouch material to the current collector.

In some embodiments, the individual electrode can optionally be calendered to reduce the thickness of the semi-solid electrode slurry on the current collector and/or to reduce defects. In some embodiments, a beta gauge such as a moving web thickness and/or weight measurement system can be used to ensure proper and consistent z-directional thickness of the semi-solid electrode slurry on the current collector. In some embodiments, a video camera and computer processor can be used to visually inspect the finished electrodes and discard any defective electrodes, e.g., using a computer vision program.

In some embodiments, e.g., as shown in FIG. 11, the semi-solid electrode slurry can be disposed onto the current collector on a roll casting system. In some embodiments, the roll casting system can include a vacuum pallet or vacuum conveyor system configured to convey the current collector through the manufacturing system. In some embodiments, the anode can be manufactured in an anode conveyor system and the cathode can be manufactured in a cathode conveyor system. In some embodiments, the anode conveyor system and the conveyor system can be positioned opposite each other so that the conveyors deliver finished anodes nearby finished cathodes for easy electrochemical cell assembly. In some embodiments, a separator roll feeder can deliver a constant or intermittent supply of a separator material between each anode and the corresponding cathode. In some embodiments, the separator can be interposed between the cathode and the anode after the mask material is removed and before or after the finished electrodes are formed by cutting the current collectors.

In some embodiments, once the mask material is removed, the conveyor systems can be configured to convey the current collector past a beta gauge to determine the thickness of the semi-solid electrode slurry on the current collector. In some embodiments, if the finished electrode is thicker than desired, the electrode can be calendered (before or after the mask material is removed) to reduce the thickness and/or densify the semi-solid electrode material and/or remove electrolyte.

In some embodiments, the roll casting system can be configured to continuously form cathodes and continuously form electrodes, continuously interpose a separator therebetween. In some embodiments, the roll casting system can continuously form finished electrodes by sealing the discrete portions of the semi-solid electrode materials between portions of a pouch material and cutting the pouch material to form the individual pouch cells.

Endo Frame

In some embodiments, the continuous or semi-continuous process of manufacturing a semi-solid electrode can include the use of an endo frame structure. In some embodiments, instead of or in addition to masking material, as described above, the endo frame structure can be disposed onto the current collector before disposing the semi-solid electrode slurry onto the current collector. In some embodiments, the endo frame can hold the current collector in place. In some embodiments, the endo frame can have at least some z-directional thickness such that the endo frame at least partially defines a cavity into which the semi-solid electrode slurry can be disposed and retained on the surface of the current collector.

In some embodiments, the endo frame can at least partially define the surface area of the finished electrode (e.g., as the interior extents of the endo frame). In some embodiments, the endo frame can at least partially define the thickness of the semi-solid electrode slurry on the current collector based upon the z-directional height of the endo frame. In some embodiments, the semi-solid electrode slurry can be smoothed or spread along the surface of the exposed portion of the current collector. In some embodiments, a blade (also referred to herein as "doctor blade") or other straight edged instrument can be used to spread the semi-solid electrode slurry. In some embodiments, the blade and/or the endo frame can be operably coupled to a vibration source to vibrate the blade or the endo frame during semi-solid electrode slurry deposition or smoothing. The vibration may facilitate dispersion of the semi-solid electrode slurry material during or after the slurry deposition step.

In some embodiments, an instrument, such as for example, an optical or any analytical tool using any of non-contact measurement techniques, including optical or laser interferometry, ellipsometry or optical or laser scanning probe to inspect surface morphology and optionally measure surface uniformity (e.g., thickness) of the spread semi-solid electrode slurry. In some embodiments, the non-contact instrument can be deployed in situ as the blade spreads the semi-solid electrode slurry.

In some embodiments, after the semi-solid electrode slurry is spread, the endo frame can be removed leaving only the portion of the semi-solid electrode slurry that has been spread onto the exposed portion of the current collector. Alternatively, in some embodiments, after the semi-solid electrode slurry is spread, the endo frame can remain in place and a separator can be placed on the finished electrode such that the separator, the current collector, and the endo frame each partially define an electroactive zone and contain the semi-solid electrode slurry within the electroactive zone.

In some embodiments, masking material can be used in addition to the endo frame in order to prevent contamination of the uncoated portion of the current collector and/or any exposed portions of the pouch material. In some embodiments, the endo frame can be disposed onto the current collector initially, and masking material can be applied subsequently to protect and/or define one, two, three or four of the edges of the finished electrode. In some embodiments, the masking may extend to or beyond the edge of the current collector material. In some embodiments, the masking material and the endo frame may be initially integral pieces of a single disposed material, the single disposed material configured such that the masking can be removed while the endo frame remains disposed onto the current collector. In some embodiments, the single disposed material including the endo frame and the masking material can be substantially fully removed from the current collector after the semi-solid electrode slurry is disposed onto the current collector.

In some embodiments, the endo frame can extend out to the edge of the current collector material such that semi-solid electrode slurry can be disposed more rapidly and less judiciously onto the continuous current collector. Likewise, in some embodiments, each endo frame can be positioned and configured to directly and securely abut at least one other endo frame such that semi-solid electrode slurry cannot be disposed the continuous current collector or pouch material between the two or more endo frames. In some embodiments, after the semi-solid electrode slurry has been disposed to the current collector, a vibratory or other suitable method can be used to remove any semi-solid electrode slurry that has built up on top of the endo frame structure.

In some embodiments, the endo frame and/or masking material can be configured such that the endo frame and/or masking material naturally repels the semi-solid electrode slurry to some extent, based on chemistry, electrochemistry, physical structure, or other characteristics. In some embodiments, the endo frame and/or masking material can be made from a material that creates a small contact angle with respect to the semi-solid electrode slurry. In some embodiments, the endo frame and/or masking material used when manufacturing the anode can be different from the endo frame and/or masking material used when manufacturing the cathode due to chemical differences between the anode semi-solid electrode slurry and the cathode semi-solid electrode slurry.

Continuous with Doctor Blade

Figure 12A:
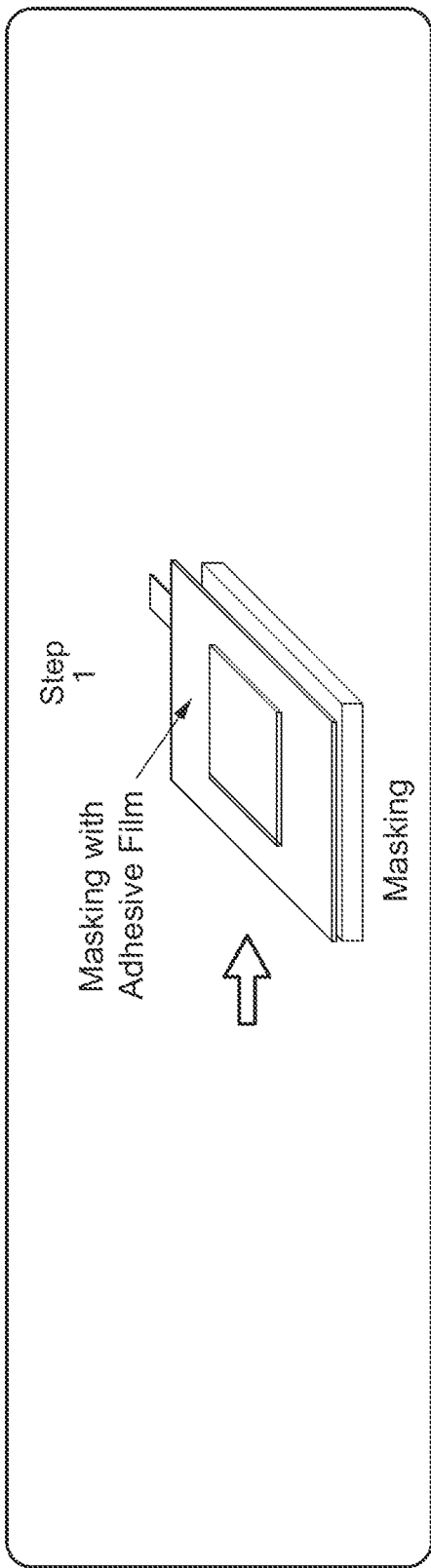
FIGS. 12A-12C illustrate steps of a process to manufacture an electrochemical cell, according to an embodiment.
Figure 12B:
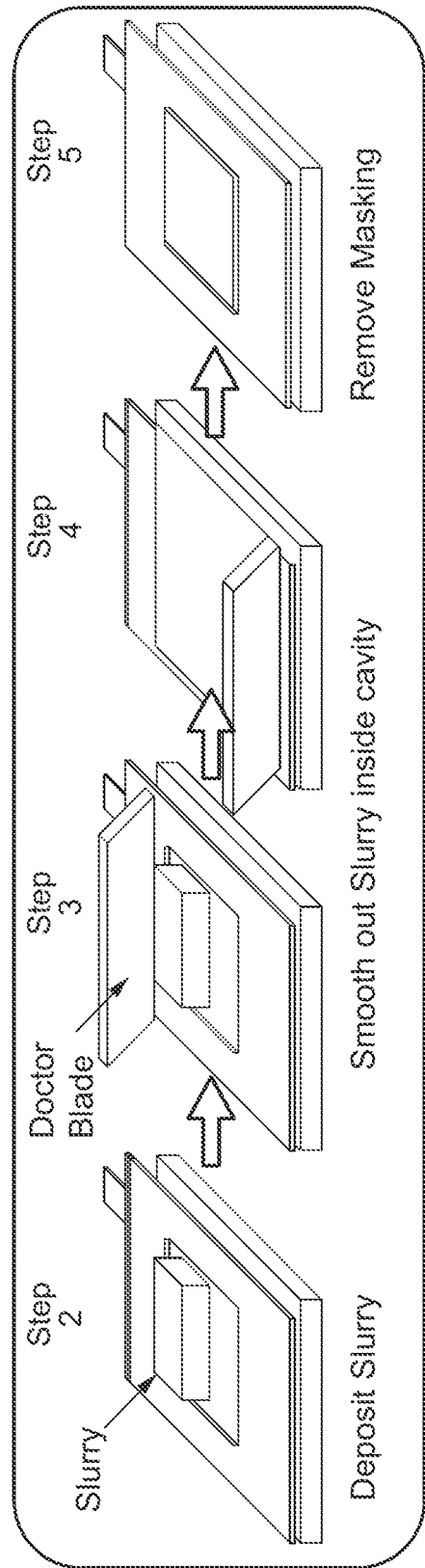
Figure 12C:
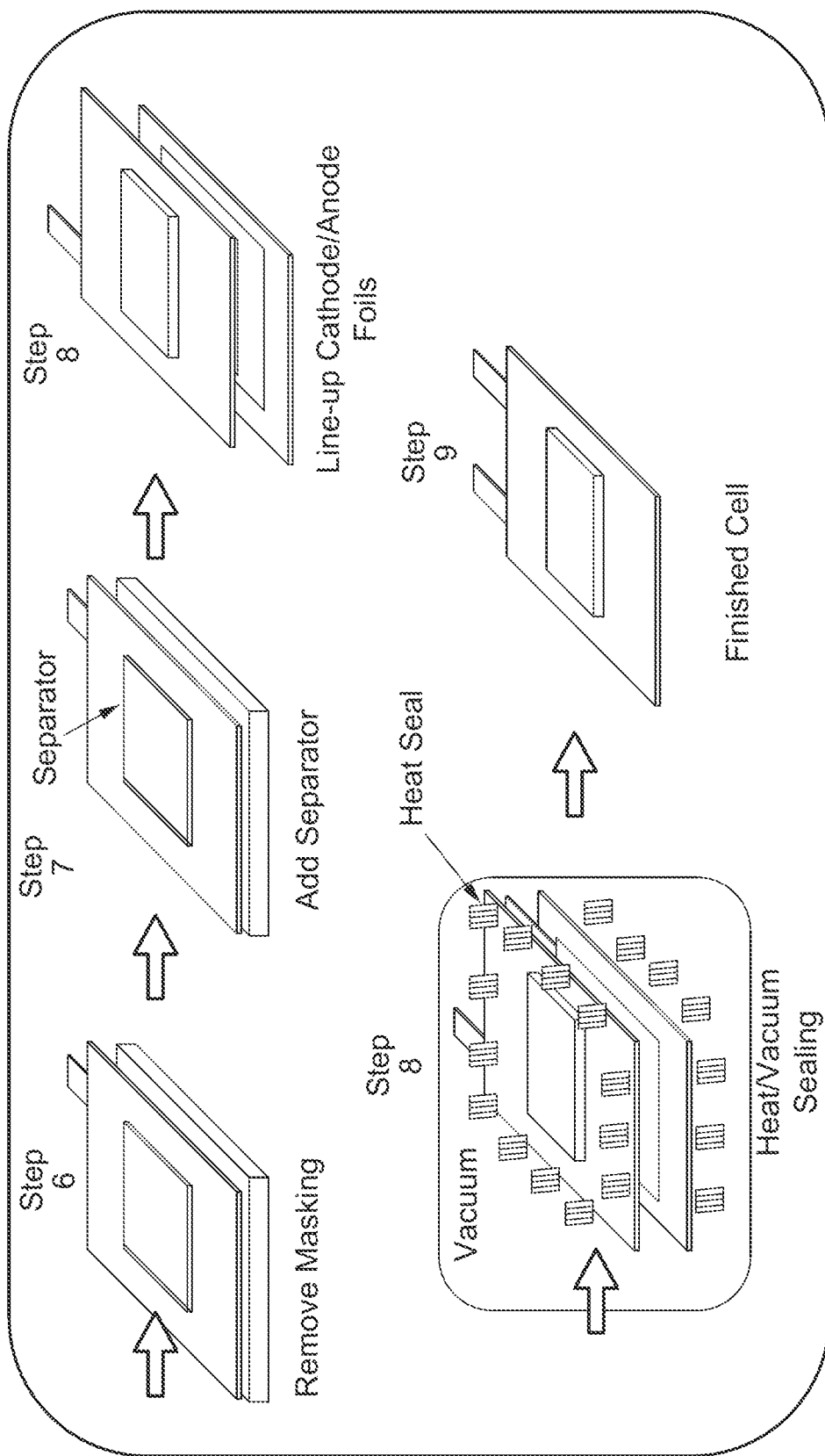

FIGS. 12A-12C illustrate various steps in a process of manufacturing an electrochemical cell having at least one of the anode and cathode including a semi-solid electrode slurry. As shown in FIG. 12A, at step 1, a masking material can be placed over a portion of an electrically conductive material that can be used as the current collector for the electrochemical cell. In some embodiments, the masking material can be disposed to the conductive material such that only the exposed portion of the conductive material visible through the masking is available for deposition of the semi-solid electrode slurry. In some embodiments, the conductive material can include a protruding piece of conductive material that can be a power connection tab.

As shown in FIG. 12B, at step 2, the semi-solid electrode slurry can be placed on the exposed portion of the conductive material. At steps 3 and 4, the electrode can be smoothed or spread along the surface of the exposed portion of the second layer. For example, a blade or straight edged instrument can be used to spread the electrode. At step 5, the masking can be removed, leaving only the portion of the electrode that has been spread onto the exposed portion of the conductive material. As shown in FIG. 12C, at step 6, a separator can be placed on a portion of the current collector such that the separator is covering the electrode. At step 7, the completed semi-solid electrode and separator of step 6 can be joined with another electrode. For example, the electrode of step 6 can be a cathode electrode and the other electrode can include an anode electrode. At step 8, a vacuum and heat seal process can be performed to seal the two laminate sheets together to form the finished cell as shown at step 9.

In some embodiments, after semi-solid electrode slurry deposition, the finished cathodes and anodes can be stacked with a separator interposed. In some embodiments, the separator is first disposed to the pouch material and a cathode can be stacked onto the separator, then the separator can be folded over the cathode and an anode can be stacked onto the separator and the separator can be folded back across the anode. In some embodiments, this process of folding the separator back and forth and alternatively stacking anode and cathode can be carried out until the appropriate number of anodes and cathodes are assembled accordingly. In some embodiments, the cathode and anode can be arranged according to a transverse or longitudinal plane and sealed into formation by any of the heat sealing methods described herein. In some embodiments, the resulting assembly can be folded in a zig-zag pattern with the separator to form the finished electrochemical cell. While the use of either stacking or zig-zag folding have been described with respect to a continuous manufacturing processing using masking materials, either of the methods for handling the finished electrodes, or any other suitable method, can be used with any of the methods and systems described herein.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments described herein.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

The invention claimed is:

1. A method, comprising:
   disposing a current collector material on a first plate and a second plate;
   moving the first plate relative to the second plate, such that a first portion of the current collector material is on the first plate, a second portion of the current collector material is on the second plate, and a third portion of the current collector material is clamped between the first plate and the second plate;
   continuously dispensing a semi-solid electrode material onto the first portion of the current collector material and the second portion of the current collector material; and
   moving the second plate relative to the first plate, such that the first portion of the current collector material moves relative to the second portion of the current collector material, and the third portion of the current collector material is released from between the first plate and the second plate, the third portion of the current collector being uncoated.

2. The method of claim 1, wherein the semi-solid electrode material is binderless.

3. The method of claim 1, further comprising:
   pushing and/or pulling the third portion of the current collector material between the first portion of the current collector material and the second portion of the current collector material via a tucking device.

4. The method of claim 1, wherein the first plate and the second plate are movable between a first configuration and a second configuration, an edge of the first plate abutting an edge of the second plate to frictionally engage the third portion of the current collector material in the first configuration, the edge of the first plate separated from the edge of the second plate in the second configuration so that the portion of the third current collector material can be removed from between the two plates.

5. The method of claim 1, further comprising:
adjoining a portion of the semi-solid electrode material with a second electrode interposed by a separator to form a finished electrochemical cell.

6. The method of claim 1, further comprising:
inspecting the semi-solid electrode material via a video camera and computer processor.

7. The method of claim 1, wherein moving the second plate relative to the first plate is via rotating the first plate away from the second plate.

8. The method of claim 1, further comprising:
conveying the first plate and the second plate via a conveyor.

9. The method of claim 8, wherein the conveyor includes a vacuum pallet.

10. A method, comprising:
disposing a current collector material on a first pallet and a second pallet;
moving the first pallet relative to the second pallet, such that a first portion of the current collector material is on the first pallet, a second portion of the current collector material is on the second pallet, and a third portion of the current collector material is clamped between the first pallet and the second pallet;
dispensing a semi-solid electrode material onto the first portion of the current collector material and the second portion of the current collector material; and
moving the second pallet relative to the first pallet, such that the first portion of the current collector material moves relative to the second portion of the current collector material, and the third portion of the current collector material is released from between the first pallet and the second pallet, the third portion of the current collector being uncoated.

11. The method of claim 10, wherein the semi-solid electrode slurry is binderless.

12. The method of claim 10, further comprising:
pushing and/or pulling the third portion of the current collector material between the first portion of the current collector material and the second portion of the current collector material via a tucking device.

13. The method of claim 10, wherein the first pallet has a first securing edge and the second pallet has a second securing edge, the first securing edge abutting the second securing edge to frictionally engage the third portion of the current collector material.

14. The method of claim 10, further comprising:
adjoining a portion of the semi-solid electrode material with a second electrode interposed by a separator to form a finished electrochemical cell.

15. The method of claim 10, wherein moving the second pallet relative to the first pallet is via rotating the first pallet away from the second pallet.

16. The method of claim 10, further comprising:
conveying the first pallet and the second pallet via a conveyor.

17. The method of claim 16, wherein the conveyor includes a vacuum pallet.

18. A method, comprising:
placing a current collector material on a first plate and a second plate;
moving the first plate relative to the second plate, such that a first portion of the current collector material is on the first plate, a second portion of the current collector material is on the second plate, and a third portion of the current collector material is clamped between the first plate and the second plate;
dispensing a semi-solid electrode material onto the first portion of the current collector material and the second portion of the current collector material; and
rotating the second plate relative to the first plate, such that the first portion of the current collector material moves relative to the second portion of the current collector material, and the third portion of the current collector material is released from between the first plate and the second plate, the third portion of the current collector being uncoated.

19. The method of claim 18, wherein the semi-solid electrode slurry is binderless.

20. The method of claim 18, further comprising:
pushing and/or pulling the third portion of the current collector material between the first portion of the current collector material and the second portion of the current collector material via a tucking device.

21. The method of claim 18, wherein the first plate has a first securing edge and the second plate has a second securing edge, the first securing edge abutting the second securing edge to frictionally engage the third portion of the current collector material.

22. The method of claim 18, further comprising:
adjoining a portion of the semi-solid electrode material with a second electrode interposed by a separator to form a finished electrochemical cell.

23. The method of claim 18, further comprising:
conveying the first plate and the second plate via a conveyor.

24. The method of claim 23, wherein the conveyor includes a vacuum pallet.

* * * * *